(12) United States Patent
Furuya et al.

(10) Patent No.: US 11,787,506 B2
(45) Date of Patent: Oct. 17, 2023

(54) DERAILLEUR FOR HUMAN-POWERED VEHICLE

(71) Applicant: SHIMANO INC., Sakai (JP)

(72) Inventors: Takashi Furuya, Sakai (JP); Kazutaka Fukao, Sakai (JP)

(73) Assignee: SHIMANO INC., Sakai (JP)

( * ) Notice: Subject to any disclaimer, the term of this patent is extended or adjusted under 35 U.S.C. 154(b) by 156 days.

(21) Appl. No.: 17/218,058

(22) Filed: Mar. 30, 2021

(65) Prior Publication Data

US 2022/0315165 A1  Oct. 6, 2022

(51) Int. Cl.
*B62M 9/136* (2010.01)
*B62M 9/1342* (2010.01)

(52) U.S. Cl.
CPC .......... *B62M 9/136* (2013.01); *B62M 9/1342* (2013.01)

(58) Field of Classification Search
CPC .... B62M 9/136; B62M 9/1342; B62M 9/134; B62M 9/131; B62M 9/1344
USPC ...................................... 474/80, 82
See application file for complete search history.

(56) References Cited

U.S. PATENT DOCUMENTS

| | | | | |
|---|---|---|---|---|
| 4,078,444 A * | 3/1978 | Huret | ..................... | B62M 9/136 474/140 |
| 4,237,743 A * | 12/1980 | Nagano | ................. | B62M 9/135 474/140 |
| 4,586,913 A * | 5/1986 | Nagano | ................ | B62M 9/1348 474/82 |
| 4,778,436 A * | 10/1988 | Nagano | .................. | B62M 9/136 474/82 |
| 5,037,355 A * | 8/1991 | Kobayashi | ........... | B62M 9/1348 474/82 |
| 5,312,301 A * | 5/1994 | Kobayashi | ............. | B62M 9/136 474/140 |
| 5,728,018 A * | 3/1998 | Terada | ................. | B62M 9/1344 474/127 |
| 5,779,581 A * | 7/1998 | Fujii | ...................... | B62M 9/136 474/82 |
| 6,277,044 B1 * | 8/2001 | Fujimoto | ................. | B62J 23/00 474/82 |
| 6,629,903 B1 * | 10/2003 | Kondo | ................... | B62M 9/136 474/82 |
| 6,641,495 B2 | 11/2003 | Valle | | |
| 7,186,194 B2 * | 3/2007 | Nankou | ............... | B62M 9/1348 474/80 |
| 8,932,162 B2 | 1/2015 | Emura et al. | | |
| 9,132,885 B2 | 9/2015 | Auer | | |
| 9,284,017 B2 * | 3/2016 | Jordan | ................... | B62M 9/134 |

(Continued)

*Primary Examiner* — Henry Y Liu
(74) *Attorney, Agent, or Firm* — MORI & WARD, LLP

(57) ABSTRACT

A derailleur comprises a base member, a chain guide, and a linkage structure. The linkage structure includes a first link pivotally coupled to the base member about a first link pivot axis. The chain guide includes a first chain guide pivotally coupled to the first link about a first guide pivot axis spaced apart from the first link pivot axis. The first chain guide includes a first guide body and a first guide protrusion. The first guide protrusion protrudes from the first guide body and is pivotally coupled to the first link about the first guide pivot axis. The first guide protrusion is spaced apart from the first link in an axial direction with respect to the first guide pivot axis to define an intermediate space between the first guide protrusion and the first link in the axial direction. The intermediate space is free of a spring.

21 Claims, 19 Drawing Sheets

(56) References Cited

U.S. PATENT DOCUMENTS

| | | | |
|---|---|---|---|
| 2002/0034996 A1* | 3/2002 | Valle | B62M 9/136 474/82 |
| 2004/0157690 A1* | 8/2004 | Nankou | B62M 9/1342 474/80 |
| 2005/0192137 A1* | 9/2005 | Ichida | B62M 9/132 474/70 |
| 2005/0197222 A1* | 9/2005 | Tatsumi | B62M 9/132 474/70 |
| 2006/0058133 A1* | 3/2006 | Tetsuka | B62M 9/136 474/82 |
| 2006/0189421 A1* | 8/2006 | Ichida | B62M 9/132 474/82 |
| 2006/0258494 A1* | 11/2006 | Auer | B62M 9/135 474/80 |
| 2007/0117666 A1* | 5/2007 | Ichida | B62M 9/135 474/80 |
| 2007/0123379 A1* | 5/2007 | Peh | B62M 9/136 474/80 |
| 2007/0191158 A1* | 8/2007 | Ichida | B62M 9/136 474/70 |
| 2008/0274845 A1* | 11/2008 | Valle | B62M 9/1342 474/80 |
| 2008/0300076 A1* | 12/2008 | Fukushima | B62M 9/1344 474/80 |
| 2010/0022335 A1* | 1/2010 | Chiang | B62M 9/136 474/80 |
| 2012/0157250 A1* | 6/2012 | Jordan | B62M 9/134 29/428 |
| 2012/0295745 A1* | 11/2012 | Emura | B62M 9/1344 474/80 |
| 2013/0029795 A1* | 1/2013 | Jordan | B62M 9/134 474/80 |
| 2013/0072333 A1* | 3/2013 | Kuwayama | B62M 9/1348 474/82 |
| 2013/0085024 A1* | 4/2013 | Inoue | B62M 9/136 474/80 |
| 2013/0085025 A1* | 4/2013 | Inoue | B62M 9/136 474/80 |
| 2014/0148287 A1* | 5/2014 | Tachibana | B62M 9/132 474/82 |
| 2014/0155205 A1* | 6/2014 | Kuwayama | B62M 9/135 474/80 |
| 2014/0243126 A1* | 8/2014 | Kuwayama | B62M 9/132 474/80 |
| 2014/0243128 A1* | 8/2014 | Pasqua | B62M 9/132 474/80 |
| 2014/0349793 A1* | 11/2014 | Emura | B62M 9/134 474/80 |
| 2014/0378252 A1* | 12/2014 | Carrasco Vergara | B62L 3/023 474/82 |
| 2015/0018145 A1* | 1/2015 | Emura | B62M 9/1342 474/80 |
| 2015/0018146 A1* | 1/2015 | Emura | B62M 9/135 474/80 |
| 2015/0353166 A1* | 12/2015 | Kuwayama | B62M 9/135 474/82 |
| 2016/0068225 A1* | 3/2016 | Kuwayama | B62M 9/1342 474/80 |
| 2016/0075401 A1* | 3/2016 | Kuwayama | B62M 9/1342 474/80 |
| 2016/0229488 A1* | 8/2016 | Kuwayama | B62M 9/1346 |
| 2017/0001685 A1* | 1/2017 | Kuwayama | B62M 9/1342 |
| 2017/0101155 A1* | 4/2017 | Tachibana | B62K 25/286 |
| 2020/0156737 A1* | 5/2020 | Liao | B62J 43/30 |
| 2020/0298935 A1* | 9/2020 | Wu | B62M 9/138 |
| 2020/0377175 A1* | 12/2020 | Fujimoto | B62M 9/136 |

* cited by examiner ly coupled to the base member about a first link pivot axis. The chain guide includes a first chain guide pivotally coupled to the first link about a first guide pivot axis spaced apart from the first link pivot axis. The first chain guide includes a first guide body and a first guide protrusion. The first guide body includes a first guide surface configured to be in contact with a chain. The first guide protrusion protrudes from the first guide body and is pivotally coupled to the first link about the first guide pivot axis. The first guide protrusion is spaced apart from the first link in an axial direction with respect to the first guide pivot axis to define an intermediate space between the first guide protrusion and the first link in the axial direction. The intermediate space is free of a spring.
DERAILLEUR FOR HUMAN-POWERED VEHICLE

BACKGROUND OF THE INVENTION

Field of the Invention

The present invention relates to a derailleur for a human-powered vehicle.

Discussion of the Background

A human-powered vehicle includes a derailleur configured to move a chain relative to a plurality of sprockets. The derailleur includes a chain guide which is contactable with the chain. The chain guide preferably has rigidity necessary to guide the chain.

SUMMARY OF THE INVENTION

In accordance with a first aspect of the present invention, a derailleur for a human-powered vehicle comprises a base member, a chain guide, and a linkage structure. The base member is configured to be mounted to the human-powered vehicle. The chain guide is movable relative to the base member. The linkage structure is configured to movably couple the chain guide to the base member. The linkage structure includes a first link pivotal With the derailleur according to the first aspect, it is possible to make a size of the chain guide in the axial direction larger since the first guide protrusion is spaced apart from the first link in the axial direction, improving rigidity of the chain guide. Furthermore, a size of the intermediate space defined between the first guide protrusion and the first link can be changed since the intermediate space is free of a spring, improving the flexibility of the positional relationship between the first guide protrusion and the first link. Accordingly, it is possible to improve rigidity of the chain guide while improving flexibility of design of the chain guide and/or the first link.

In accordance with a second aspect of the present invention, the derailleur according to the first aspect further comprises a biasing member. The biasing member is configured to apply biasing force to at least one of the linkage structure and the chain guide. The biasing member is provided outside the intermediate space.

With the derailleur according to the second aspect, it is possible to improve the rigidity of the chain guide and the flexibility of design of the chain guide and/or the first link while utilizing the biasing member.

In accordance with a third aspect of the present invention, the derailleur according to the second aspect is configured so that the intermediate space is provided between the first guide protrusion and the biasing member in the axial direction.

With the derailleur according to the third aspect, it is possible to effectively improve the rigidity of the chain guide and the flexibility of design of the chain guide and/or the first link while utilizing the biasing member.

In accordance with a fourth aspect of the present invention, the derailleur according to any one of the first to third aspects is configured so that the first guide protrusion is provided on a front side of the chain guide in a mounting state where the base member is mounted to the human-powered vehicle.

With the derailleur according to the fourth aspect, the first guide protrusion can improve rigidity of the front-side part of the chain guide.

In accordance with a fifth aspect of the present invention, the derailleur according to any one of the first to fourth aspects is configured so that the first link includes a first link body and a first link protrusion protruding from the first link body. The first guide protrusion is pivotally coupled to the first link protrusion about the first guide pivot axis. The first guide protrusion is spaced apart from the first link protrusion in the axial direction to define the intermediate space between the first guide protrusion and the first link protrusion in the axial direction.

With the derailleur according to the fifth aspect, the first link protrusion can improve rigidity of the first link. Thus, it is possible to improve the rigidity of the chain guide and the first link while it is possible to improve the flexibility of design of the chain guide and/or the first link.

In accordance with a sixth aspect of the present invention, the derailleur according to the fifth aspect is configured so that the intermediate space and the first link protrusion are provided between the first guide protrusion and the biasing member in the axial direction.

With the derailleur according to the sixth aspect, it is possible to efficiently improve the rigidity of the chain guide and the flexibility of design of the chain guide and/or the first link while utilizing the biasing member.

In accordance with a seventh aspect of the present invention, the derailleur according to the fifth or sixth aspect is configured so that the first guide body includes a first outermost end and a first additional outermost end and extends between the first outermost end and the first additional outermost end along the first guide surface. The first guide protrusion is provided at the first outermost end.

With the derailleur according to the seventh aspect, the first guide protrusion can improve rigidity of the first outermost end of the chain guide.

In accordance with an eighth aspect of the present invention, the derailleur according to the seventh aspect is configured so that the first guide protrusion is closer to the base member than the first additional outermost end.

With the derailleur according to the eighth aspect, the first guide protrusion can improve rigidity of the first outermost end and/or the surrounding part of the chain guide.

In accordance with a ninth aspect of the present invention, the derailleur according to the seventh or eighth aspect is configured so that the first chain guide includes a first additional guide protrusion protruding from the first guide body. The first additional guide protrusion is spaced apart from the first guide protrusion in the axial direction. The first guide protrusion is farther from the first additional outermost end than the first additional guide protrusion.

With the derailleur according to the ninth aspect, first guide protrusion and the first additional guide protrusion can improve rigidity of the first outermost end and/or the surrounding part of the chain guide.

In accordance with a tenth aspect of the present invention, the derailleur according to any one of the fifth to ninth aspects is configured so that the first link includes a first additional link protrusion protruding from the first link body. The first additional link protrusion is spaced apart from the first link protrusion in the axial direction. The first link protrusion and the first additional link protrusion are provided between the first guide protrusion and the first additional guide protrusion in the axial direction.

With the derailleur according to the tenth aspect, first guide protrusion, the first additional guide protrusion, the first link protrusion, and the first additional link protrusion can improve the rigidity of the chain guide.

In accordance with an eleventh aspect of the present invention, the derailleur according to the tenth aspect is configured so that a first distance is defined between the first guide protrusion and the first link protrusion in the axial direction. A first additional distance is defined between the first additional guide protrusion and the first additional link protrusion in the axial direction. The first distance is longer than the first additional distance.

With the derailleur according to the eleventh aspect, the first guide protrusion can improve rigidity of the first guide protrusion and the surrounding part of the first guide protrusion.

In accordance with a twelfth aspect of the present invention, the derailleur according to any one of the first to eleventh aspects is configured so that the linkage structure includes a first link pin extending along the first guide pivot axis. The first link pin is configured to pivotally couple the first guide protrusion to the first link about the first guide pivot axis.

With the derailleur according to the twelfth aspect, the first link pin can pivotally couple the first guide protrusion to the first link with a simple structure.

In accordance with a thirteenth aspect of the present invention, the derailleur according to the twelfth aspect further comprises an adjustment structure configured to change an end position of the chain guide. The adjustment structure includes an adjustment screw and an adjustment support. The adjustment support is pivotally coupled to the first link pin and includes a support hole. The adjustment screw extends through the support hole.

With the derailleur according to the thirteenth aspect, it is possible to change the end position of the chain guide with a simple structure.

In accordance with a fourteenth aspect of the present invention, the derailleur according to the thirteenth aspect further comprises a transmitting member configured to transmit actuation force to the linkage structure. The first link includes a threaded hole. The adjustment screw includes an external threaded part and a contact end. The external threaded part is threadedly engaged with the threaded hole. The contact end is configured to be in contact with the transmitting member to position the chain guide in the end position.

With the derailleur according to the fourteenth aspect, it is possible to change the end position of the chain guide with a simple structure.

In accordance with a fifteenth aspect of the present invention, the derailleur according to any one of the first to fourteenth aspects is configured so that the linkage structure includes a second link pivotally coupled to the base member about a second link pivot axis. The chain guide includes a second chain guide pivotally coupled to the second link about a second guide pivot axis spaced apart from the second link pivot axis. The second chain guide is coupled to the first chain guide to move relative to the base member along with the first chain guide.

With the derailleur according to the fifteenth aspect, the first link and the second link can stabilize the movement of the chain guide relative to the base member.

In accordance with a sixteenth aspect of the present invention, the derailleur according to any one of the first to fifteenth aspects further comprises a motor unit. The motor unit is configured to apply actuation force to at least one of the chain guide and the linkage structure to move the chain guide relative to the base member.

With the derailleur according to the sixteenth aspect, it is possible to move the chain guide using electricity.

In accordance with a seventeenth aspect of the present invention, a derailleur for a human-powered vehicle comprises a base member, a chain guide, a linkage structure, a motor unit, and a biasing member. The base member is configured to be mounted to the human-powered vehicle. The chain guide is movable relative to the base member between an inner-gear position and an outer-gear position. The chain guide is provided closer to a center plane of the human-powered vehicle when the chain guide is in the inner-gear position than when the chain guide is the outer-gear position. The linkage structure is configured to movably couple the chain guide to the base member to move relative to the base member between the inner-gear position and the outer-gear position. The motor unit is configured to apply actuation force to at least one of the chain guide and the linkage structure to move the chain guide relative to the base member. The biasing member is configured to bias the chain guide toward the inner-gear position. The linkage structure includes a first link pivotally coupled to the base member about a first link pivot axis. The chain guide includes a first chain guide pivotally coupled to the first link about a first guide pivot axis. The first chain guide includes a first guide body, a first guide protrusion, and a first additional guide protrusion. The first guide body includes a first guide surface configured to be in contact with a chain. The first guide protrusion protrudes from the first guide body and is pivotally coupled to the first link about the first guide pivot axis. The first additional guide protrusion protrudes from the first guide body and is pivotally coupled to the first link about the first guide pivot axis. The first additional guide protrusion is spaced apart from the first guide protrusion in an axial direction with respect to the first guide pivot axis. The first link is provided between the first guide protrusion and the first additional guide protrusion in the axial direction.

With the derailleur according to the seventeenth aspect, the first guide protrusion and the first additional guide protrusion can improve rigidity of the chain guide while the motor unit can move the chain guide using electricity.

In accordance with an eighteenth aspect of the present invention, the derailleur according to the seventeenth aspect is configured so that the first link includes a first link body, a first link protrusion, and a first additional link protrusion. The first link protrusion protrudes from the first link body. The first additional link protrusion protrudes from the first link body. The first additional link protrusion is spaced apart from the first link protrusion in the axial direction. The first guide protrusion is pivotally coupled to the first link protrusion about the first guide pivot axis. The first additional guide protrusion is pivotally coupled to the first additional link protrusion about the first guide pivot axis.

With the derailleur according to the eighteenth aspect, the first link protrusion and the first additional link protrusion can improve rigidity of the first link while the first guide protrusion and the first additional guide protrusion can improve rigidity of the chain guide.

In accordance with a nineteenth aspect of the present invention, the derailleur according to the eighteenth aspect is configured so that the first link protrusion is pivotally coupled to the base member about the first link pivot axis. The first additional link protrusion is pivotally coupled to the base member about the first link pivot axis.

With the derailleur according to the nineteenth aspect, the first link protrusion and the first additional link protrusion can improve rigidity of a coupling structure between the first link and the base member.

In accordance with a twentieth aspect of the present invention, the derailleur according to the nineteenth aspect is configured so that the first link protrusion includes a first link coupling part and a first guide coupling part. The first link coupling part is pivotally coupled to the base member about the first link pivot axis. The first guide coupling part is pivotally coupled to the first guide protrusion about the first guide pivot axis. The first guide coupling part is offset from the first link coupling part in the axial direction.

With the derailleur according to the twentieth aspect, it is possible to improve flexibility of the positional relationship between the first link coupling part and the first guide coupling part.

In accordance with a twenty-first aspect of the present invention, the derailleur according to the twentieth aspect is configured so that the first guide coupling part is closer to the first guide protrusion than the first link coupling part in the axial direction.

With the derailleur according to the twenty-first aspect, the positional relationship among the first guide coupling part, the first guide protrusion, and the first link coupling part can improve rigidity of a coupling structure between the first guide coupling part and the first guide protrusion.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
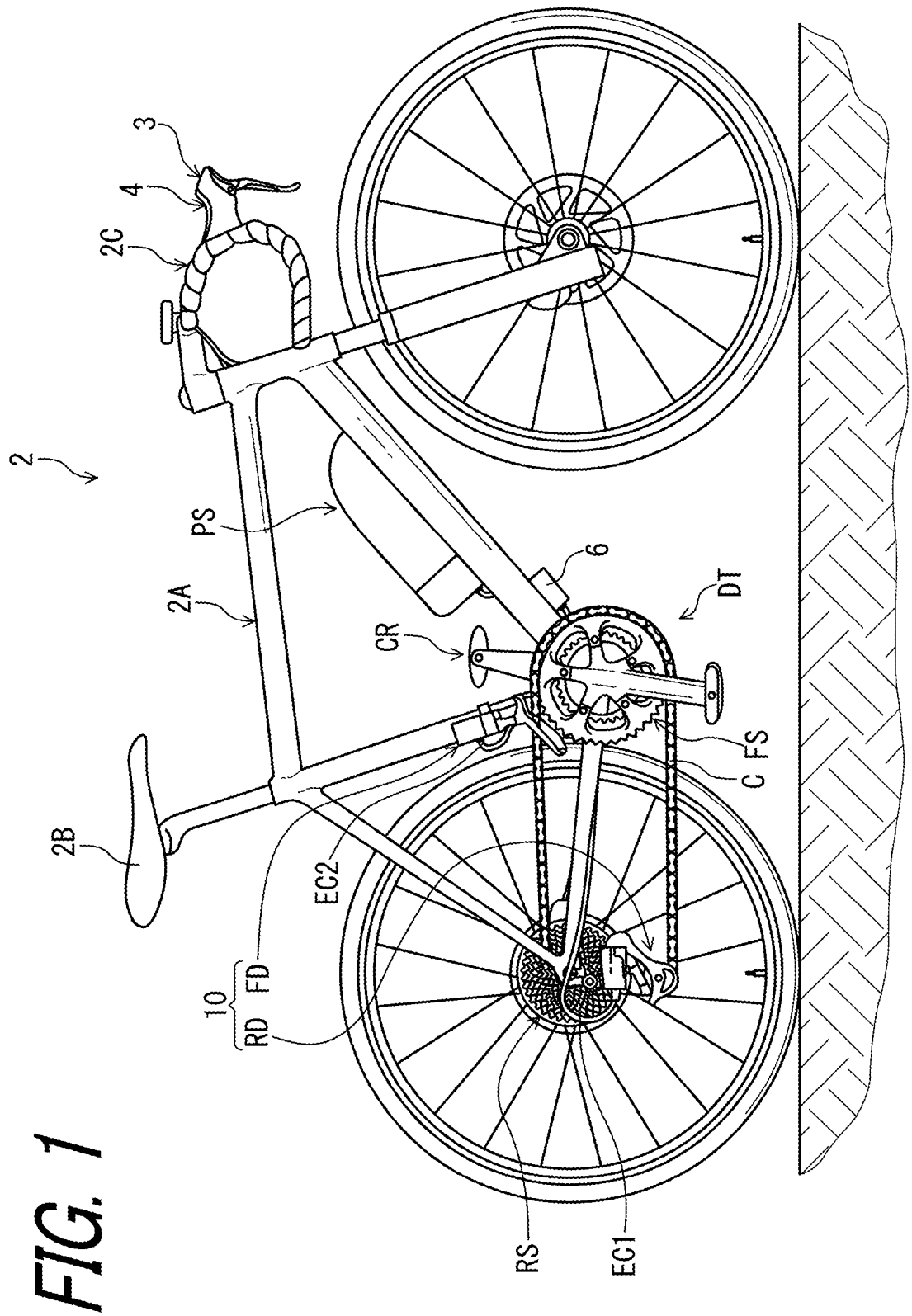
FIG. 1 is a side elevational view of a human-powered vehicle including a derailleur in accordance with a first embodiment.

The embodiment(s) will now be described with reference to the accompanying drawings, wherein like reference numerals designate corresponding or identical elements throughout the various drawings.

First Embodiment

As seen in FIG. 1, a human-powered vehicle 2 includes a derailleur 10 in accordance with a first embodiment. In the present application, a human-powered vehicle includes a various kind of bicycles such as a mountain bike, a road bike, a city bike, a cargo bike, a hand bike, and a recumbent bike. Furthermore, the human-powered vehicle includes an electric bike (E-bike). The electric bike includes an electrically assisted bicycle configured to assist propulsion of a vehicle with an electric motor. However, a total number of wheels of the human-powered vehicle is not limited to two. For example, the human-powered vehicle includes a vehicle having one wheel or three or more wheels. Especially, the human-powered vehicle does not include a vehicle that uses only an internal-combustion engine as motive power. Generally, a light road vehicle, which includes a vehicle that does not require a driver's license for a public road, is assumed as the human-powered vehicle.

The human-powered vehicle 2 further includes a vehicle body 2A, a saddle 2B, a handlebar 2C, an operating device 3, an operating device 4, a drive train DT, and an electric power source PS. The operating devices 3 and 4 are configured to be mounted to the handlebar 2C. The drive train DT includes the derailleur 10, a crank CR, a front sprocket assembly FS, a rear sprocket assembly RS, and a chain C. The derailleur 10 includes a derailleur FD and a derailleur RD. The front sprocket assembly FS is secured to the crank CR. The rear sprocket assembly RS is rotatably mounted to the vehicle body 2A. The chain C is engaged with the front sprocket assembly FS and the rear sprocket assembly RS. The derailleur RD is mounted to the vehicle body 2A and is configured to shift the chain C relative to a plurality of sprockets of the rear sprocket assembly RS to change a gear position. The derailleur FD is configured to shift the chain C relative to a plurality of sprockets of the front sprocket assembly FS. The electric power source PS is configured to be mounted to the vehicle body 2A. In the present embodiment, the electric power source PS is configured to be mounted on a down tube of the vehicle body 2A. However, the electric power source PS can be configured to be mounted to other parts of the vehicle body 2A such as a seat tube. The electric power source PS can be configured to be directly mounted to other devices such as the derailleur FD or RD.

The derailleur RD is configured to be operated using the operating device 3. The derailleur FD is configured to be operated using the operating device 4. In the present embodiment, the derailleur RD is configured to be electrically connected to the operating devices 3 and 4 through a wireless communication channel. The derailleur RD is electrically connected to the electric power source PS through an electric cable EC1. The derailleur FD is electrically connected to the electric power source PS through an electric cable EC2. The electric power source PS is configured to supply electric power to the derailleurs FD and RD through the electric cables EC1 and EC2. For example, the derailleurs FD and RD and the electric power source PS are configured to communicate with each other using a power line communication (PLC). However, the derailleurs FD and RD and the electric power source PS can be configured to communicate with each other using other communication method such as a wireless communication.

In the present application, the derailleur RD is configured to wirelessly communicate with the operating devices 3 and 4. The derailleur RD is configured to receive control signals wirelessly transmitted from each of the operating devices 3 and 4. The derailleur FD is configured to communicate with the derailleur RD through the electric power source PS and the electric cables EC1 and EC2. The derailleur RD is configured to transmit, through the electric power source PS and the electric cables EC1 and EC2 to the derailleur FD, control signals wirelessly transmitted from the operating device 4 to the derailleur RD. For example, the derailleur RD is configured to transmit, through a controller of the electric power source PS and the electric cables EC1 and EC2 to the derailleur FD, control signals wirelessly transmitted from the operating device 4 to the derailleur RD. However, the derailleur RD can be configured to receive control signals wirelessly transmitted from only one of the operating devices 3 and 4. In such embodiments, the derailleur FD can be configured to receive control signals wirelessly transmitted from the other of the operating devices 3 and 4.

However, the structure of the human-powered vehicle 2 is not limited to the above structure. For example, each of the derailleurs FD and RD can be configured to be electrically connected to the electric power source PS through the electric cables EC1 and EC2 and an additional device such as a junction box 6. Each of the derailleur RD and the electric power source PS can be configured to be electrically connected to the derailleur FD through the electric cables EC1 and EC2 if the derailleur FD includes a plurality of connection ports. Each of the derailleur FD and the electric power source PS can be configured to be electrically connected to the derailleur RD through the electric cables EC1 and EC2 if the derailleur RD includes a plurality of connection ports. The derailleur FD can be configured to be electrically connected to the derailleur RD through the electric cable EC1 or EC2 if the electric power source PS is directly mounted to one of the derailleurs FD and RD. Furthermore, the derailleur RD can be connected to at least one of the operating devices 3 and 4 through an electric cable without wireless communication. In addition, the derailleur FD can be configured to be electrically connected to at least one of the operating devices 3 and 4 through a wireless communication channel.

In the present embodiment, the derailleur FD includes a front derailleur. Namely, the derailleur FD can also be referred to as a front derailleur FD. However, structures of the derailleur FD can be applied to the derailleur RD if needed and/or desired.

In the present application, the following directional terms "front," "rear," "forward," "rearward," "left," "right," "transverse," "upward" and "downward" as well as any other similar directional terms refer to those directions which are determined on the basis of a user (e.g., a rider) who is in the user's standard position (e.g., on the saddle 2B or a seat) in the human-powered vehicle 2 with facing the handlebar 2C. Accordingly, these terms, as utilized to describe the derailleur 10 (the derailleur FD and/or RD) or other components, should be interpreted relative to the human-powered vehicle 2 equipped with the derailleur 10 (the derailleur ED and/or RD) as used in an upright riding position on a horizontal surface.

Figure 2:
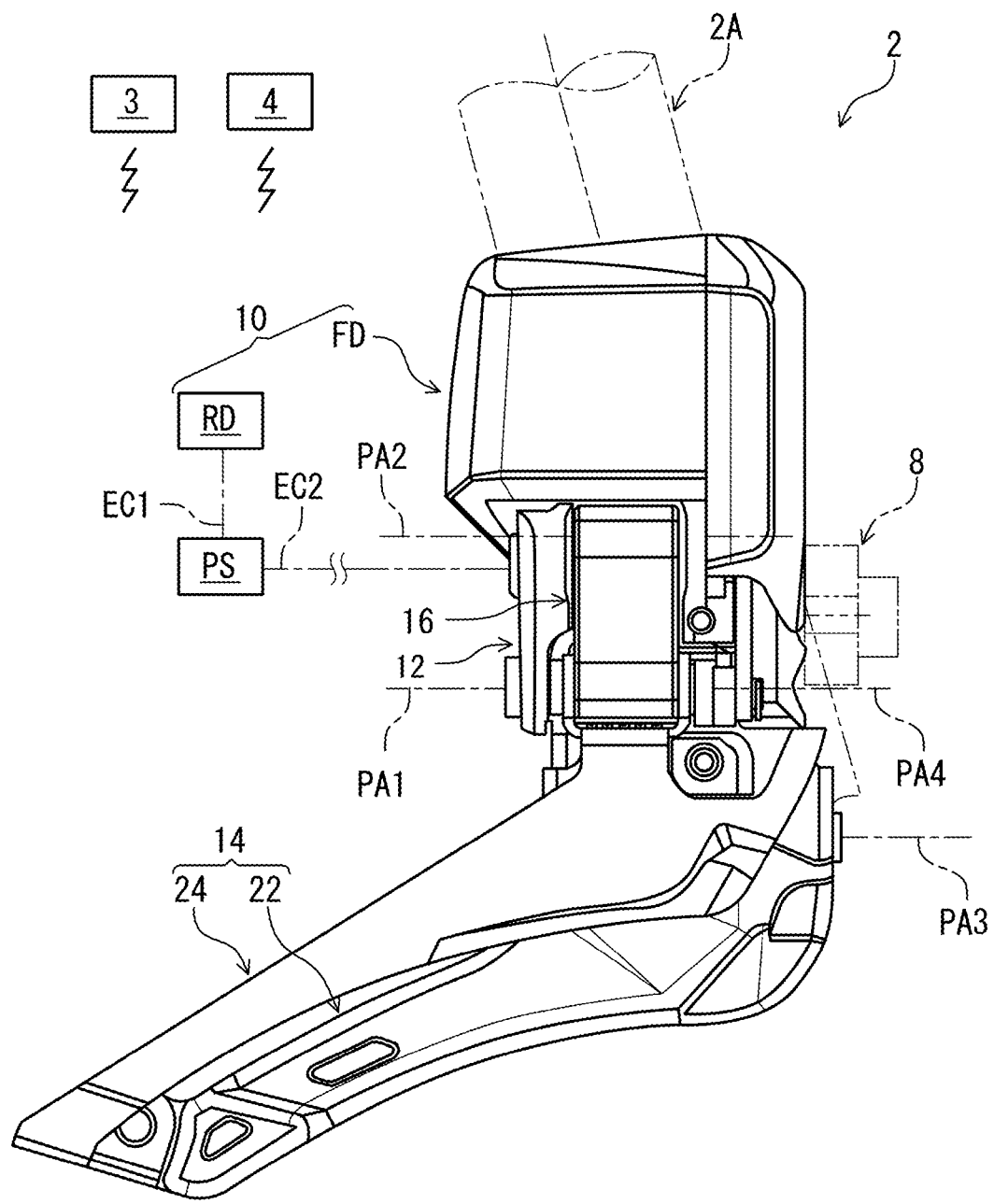
FIG. 2 is a side elevational view of the derailleur of the human-powered vehicle illustrated in FIG. 1.

As seen in FIG. 2, the derailleur FD for the human-powered vehicle 2 comprises a base member 12. The base member 12 is configured to be mounted to the human-powered vehicle 2. The base member 12 is configured to be mounted to the vehicle body 2A of the human-powered vehicle 2 via a mounting structure 8. The base member 12 is configured to be mounted to a tubular part (e.g., a seat tube) of the vehicle body 2A. However, the base member 12 can be configured to be mounted to other portions of the vehicle body 2A if needed and/or desired.

Figure 3:
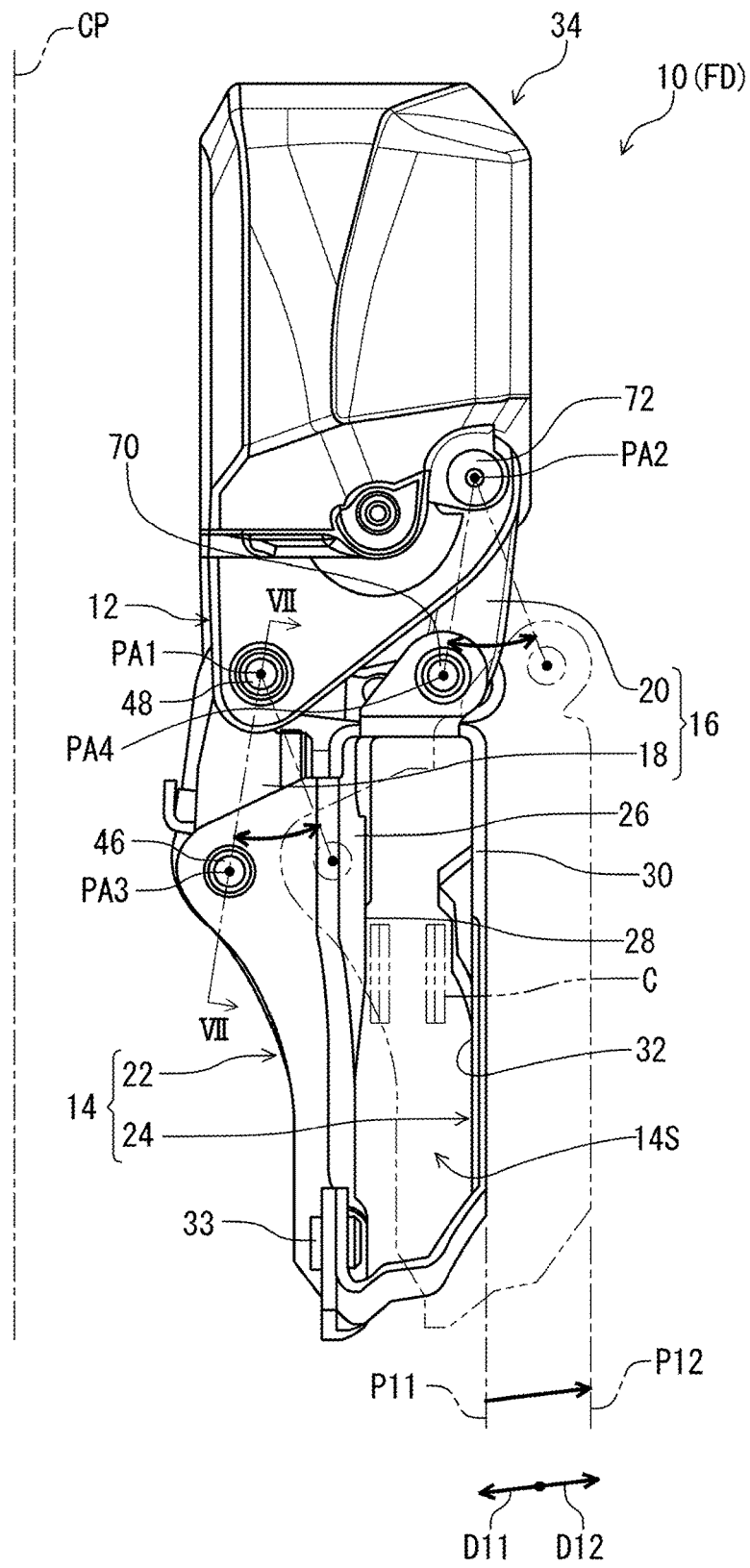
FIG. 3 is a rear view of the derailleur illustrated in FIG. 2.

As seen in FIG. 3, the derailleur FD for the human-powered vehicle 2 comprises a chain guide 14. The chain guide 14 is movable relative to the base member 12. The chain guide 14 is movable relative to the base member 12 to guide the chain C. The chain guide 14 is contactable with the chain C.

The chain guide 14 is movable relative to the base member 12 between an inner-gear position P11 and an outer-gear position P12. The chain guide 14 is movable relative to the base member 12 from the inner-gear position P11 to the outer-gear position P12 to move the chain C in an outward-shifting direction D12. The chain guide 14 is movable relative to the base member 12 from the outer-gear position P12 to the inner-gear position P11 to move the chain C in an inward-shifting direction D11 which is an opposite direction of the outward-shifting direction D12. The chain guide 14 is provided closer to a center plane CP of the human-powered vehicle 2 when the chain guide 14 is in the inner-gear position P11 than when the chain guide 14 is in the outer-gear position P12. For example, the center plane CP is defined at a transverse center of the vehicle body 2A.

The inner-gear position P11 is a position corresponding to a smaller sprocket of the front sprocket assembly FS (see e.g., FIG. 1). The outer-gear position P12 is a position corresponding to a larger sprocket of the front sprocket assembly FS (see e.g., FIG. 1). Thus, the inner-gear position P11 can also be referred to as a lower-gear position P11. The outer-gear position P12 can also be referred to as a higher-gear position P12. The chain guide 14 is configured to guide the chain C from the smaller sprocket to the larger sprocket in the outward-shifting direction D12. The chain guide 14 is configured to guide the chain C from the larger sprocket to the smaller sprocket in the inward-shifting direction D11.

The derailleur FD for the human-powered vehicle 2 comprises a linkage structure 16. The linkage structure 16 is pivotally coupled to the base member 12. The linkage structure 16 is configured to movably couple the chain guide 14 to the base member 12. The linkage structure 16 is configured to movably couple the chain guide 14 to the base member 12 to move relative to the base member 12 between the inner-gear position P11 and the outer-gear position P12.

The linkage structure 16 includes a first link 18. The first link 18 is pivotally coupled to the base member 12 about a first link pivot axis PA1. The linkage structure 16 includes a second link 20. The second link 20 is pivotally coupled to the base member 12 about a second link pivot axis PA2. The first link 18 is pivotally coupled to the chain guide 14 about a first guide pivot axis PA3. The second link 20 is pivotally coupled to the chain guide 14 about a second guide pivot axis PA4. The second link 20 is spaced apart from the first link 18 in the outward-shifting direction D12. The first link 18 is provided closer to the center plane CP than the second link 20. The first link 18 can also be referred to as an inner link 18. The second link 20 can also be referred to as an outer link 20.

The chain guide 14 includes a first chain guide 22. The first chain guide 22 is pivotally coupled to the first link 18 about the first guide pivot axis PA3 spaced apart from the first link pivot axis PA1. The chain guide 14 includes a second chain guide 24. The second chain guide 24 is pivotally coupled to the second link 20 about the second guide pivot axis PA4 spaced apart from the second link pivot axis PA2. The second chain guide 24 is coupled to the first chain guide 22 to move relative to the base member 12 along with the first chain guide 22. The chain guide 14 includes a chain-guide space 14S though which the chain C passes during pedaling. The chain-guide space 14S is defined between the first chain guide 22 and the second chain guide 24.

The first chain guide 22 includes a first guide body 26. The first guide body 26 includes a first guide surface 28 configured to be in contact with the chain C. The second chain guide 24 includes a second guide body 30. The second guide body 30 includes a second guide surface 32 configured to be in contact with the chain C. The second guide body 30 is spaced apart from the first guide body 26. The second guide surface 32 is spaced apart from the first guide surface 28. The first guide surface 28 faces toward the second guide surface 32. The second guide surface 32 faces toward the first guide surface 28.

The first chain guide 22 is closer to the center plane CP of the human-powered vehicle 2 than the second chain guide 24. The first chain guide 22 can also be referred to as an inner chain guide 22. The second chain guide 24 can also be referred to as an outer chain guide 24. The first chain guide 14B is configured to guide the chain C in the outward-shifting direction D12. The second chain guide 24 is configured to guide the chain C in the inward-shifting direction D11.

In the present embodiment, the first chain guide 22 is integrally provided with the second chain guide 24 as a one-piece unitary member. The first chain guide 22 and the second chain guide 24 are made of a metallic material. For example, the first chain guide 22 and the second chain guide 24 are formed with press working. An end of the first chain guide 22 is secured to the second chain guide 24 with a faster 33 such as a rivet. However, the first chain guide 22 can be a separate member from the second chain guide 24 if needed and/or desired. In such embodiments, the first chain guide 22 and the second chain guide 24 have structures different from each other (e.g., have different shapes, made of different materials). The first chain guide 22 can be secured to the second chain guide 24 with fasteners such as bolts or rivets.

As seen in FIG. 3, the derailleur FD for the human-powered vehicle 2 comprises a motor unit 34. The motor unit 34 is configured to apply actuation force to at least one of the chain guide 14 and the linkage structure 16 to move the chain guide 14 relative to the base member 12. In the present embodiment, the motor unit 34 is configured to apply actuation force to the linkage structure 16. However, the motor unit 34 can be configured to apply actuation force to the chain guide 14 or both the chain guide 14 and the linkage structure 16. The motor unit 34 is configured to be powered by the electric power source PS. However, the derailleur FD can include another electric power source configured to supply electricity to the motor unit 34 if needed and/or desired.

The motor unit 34 is configured to move the chain guide 14 relative to the base member 12 from the inner-gear position P11 to the outer-gear position P12 in the outward-shifting direction D12. The motor unit 34 is configured to move the chain guide 14 relative to the base member 12 from the outer-gear position P12 to the inner-gear position P11 in the inward-shifting direction D11. However, the motor unit 34 can be omitted from the derailleur FD if needed and/or desired. The chain guide 14 can be moved relative to the base member 12 in response to actuation force applied from an operating device via a mechanical cable such as a Bowden cable.

Figure 4:
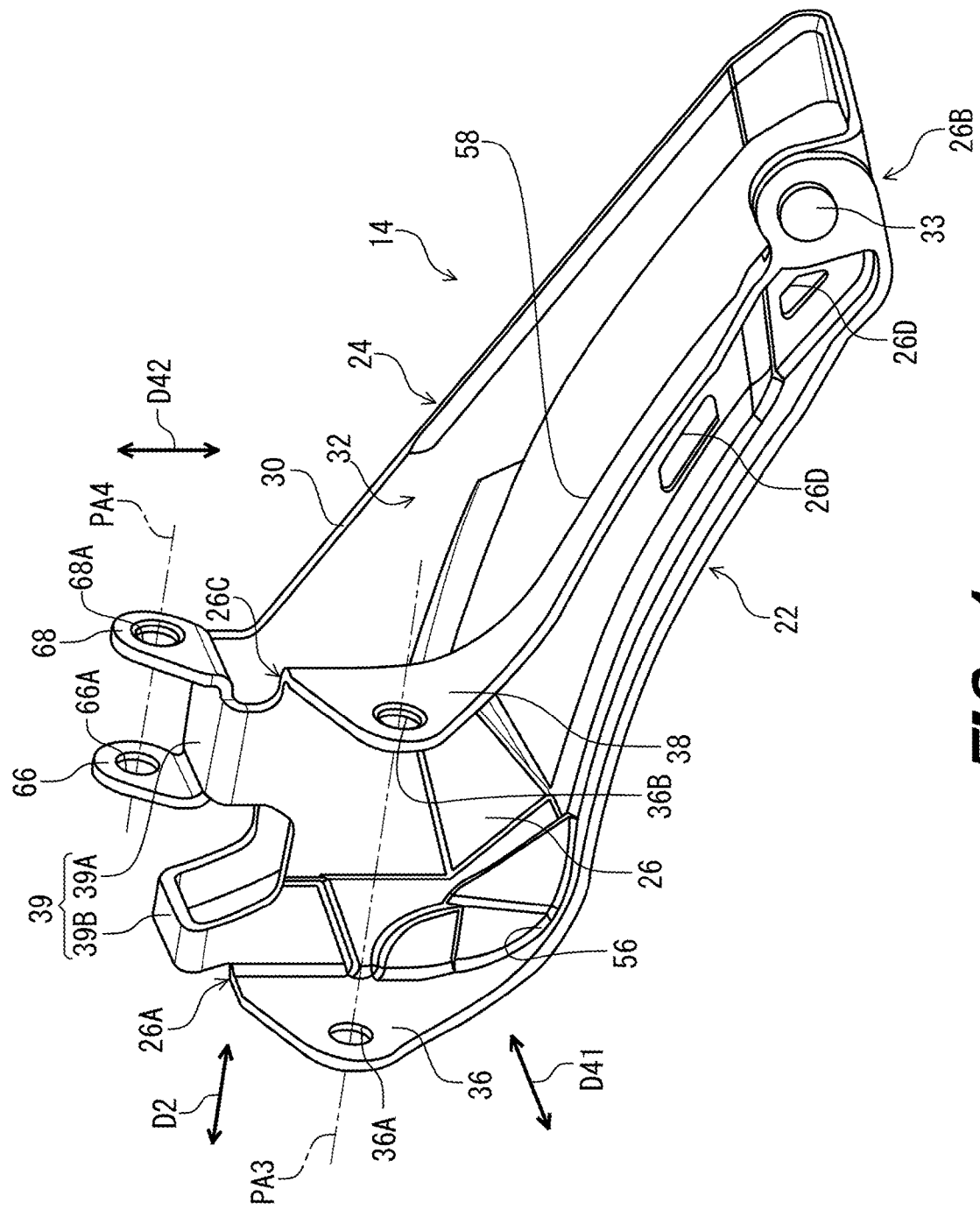
FIG. 4 is a perspective view of a chain guide of the derailleur illustrated in FIG. 2.

As seen in FIG. 4, the first chain guide 22 includes a first guide protrusion 36. The first guide protrusion 36 protrudes from the first guide body 26. The first chain guide 22 includes a first additional guide protrusion 38. The first additional guide protrusion 38 protrudes from the first guide body 26. The first additional guide protrusion 38 is spaced apart from the first guide protrusion 36 in an axial direction D2 with respect to the first guide pivot axis PA3. The structure of the first chain guide 22 is not limited to the above structure. For example, the first additional guide protrusion 38 can be omitted from the first chain guide 22 if needed and/or desired.

The second chain guide 24 includes a coupling body 39. The coupling body 39 couples the first guide body 26 to the second guide body 30. The coupling body 39 extends from the first guide body 26 to the second guide body 30. In the present embodiment, the coupling body 39 includes a first coupling body 39A and a second coupling body 39B. The first coupling body 39A is spaced apart from the second coupling body 39B in the axial direction D2.

Figure 5:
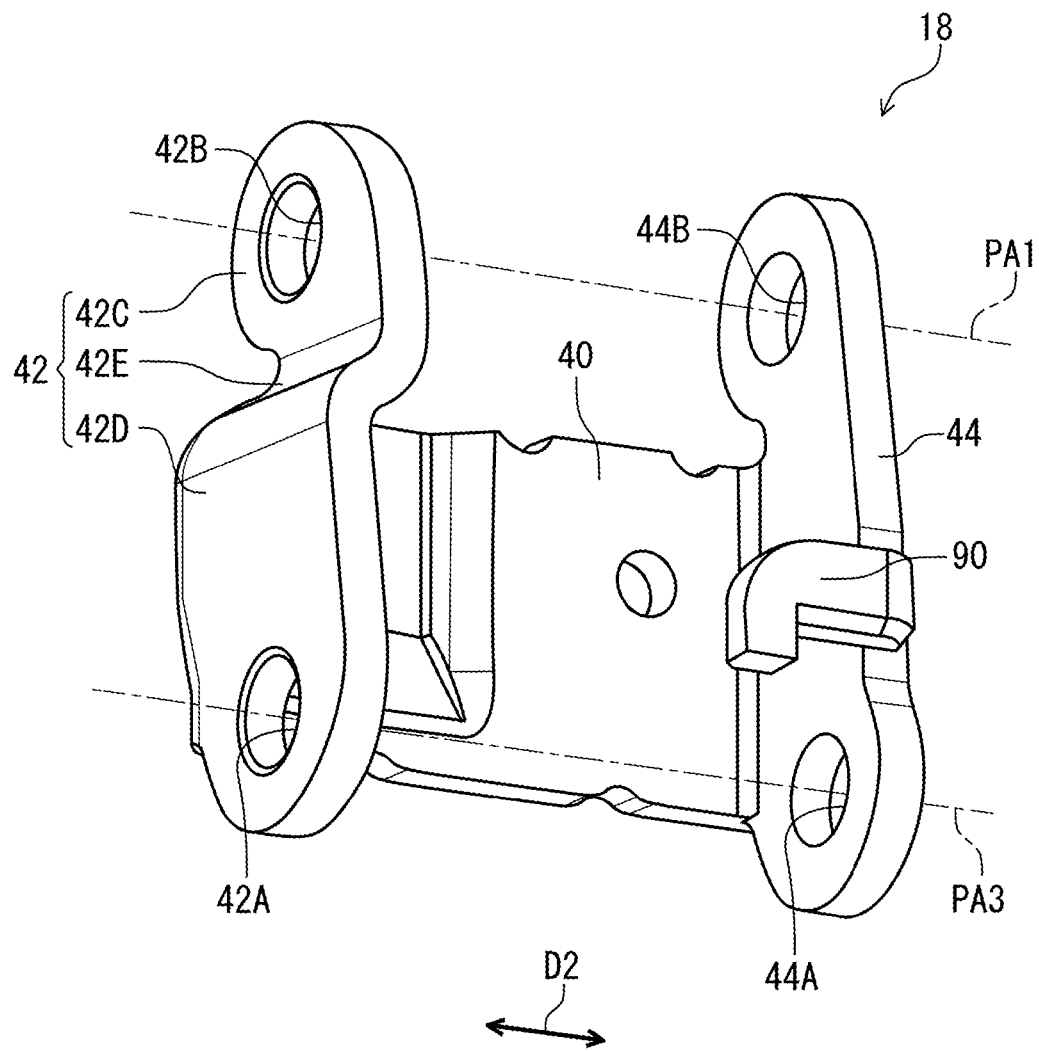
FIG. 5 is a perspective view of a first link of the derailleur illustrated in FIG. 2.

As seen in FIG. 5, the first link 18 includes a first link body 40. The first link 18 includes a first link protrusion 42. The first link protrusion 42 protrudes from the first link body 40. The first link 18 includes a first additional link protrusion 44. The first additional link protrusion 44 protrudes from the first link body 40. The first additional link protrusion 44 is spaced apart from the first link protrusion 42 in the axial direction D2. The structure of the first link 18 is not limited to the above structure. For example, at least one of the first link body 40, the first link protrusion 42, and the first additional link protrusion 44 can be omitted from the first link 18 if needed and/or desired. In such embodiments, for example, the first link 18 can include a part (e.g., a first guide coupling part 42D which will be described below) which is pivotally coupled to the first chain guide 22.

The first link protrusion 42 includes a first link coupling part 42C and a first guide coupling part 42D. The first link coupling part 42C is pivotally coupled to the base member 12 about the first link pivot axis PA1. The first link coupling part 42C includes the hole 42B. The first guide coupling part 42D includes the hole 42A. The first link coupling part 42C can be omitted from the first link protrusion 42 if needed and/or desired.

The first link protrusion 42 includes an intermediate part 42E. The intermediate part 42E extends from the first link coupling part 42C to the first guide coupling part 42D. The intermediate part 42E couples the first link coupling part 42C to the first guide coupling part 42D.

Figure 6:
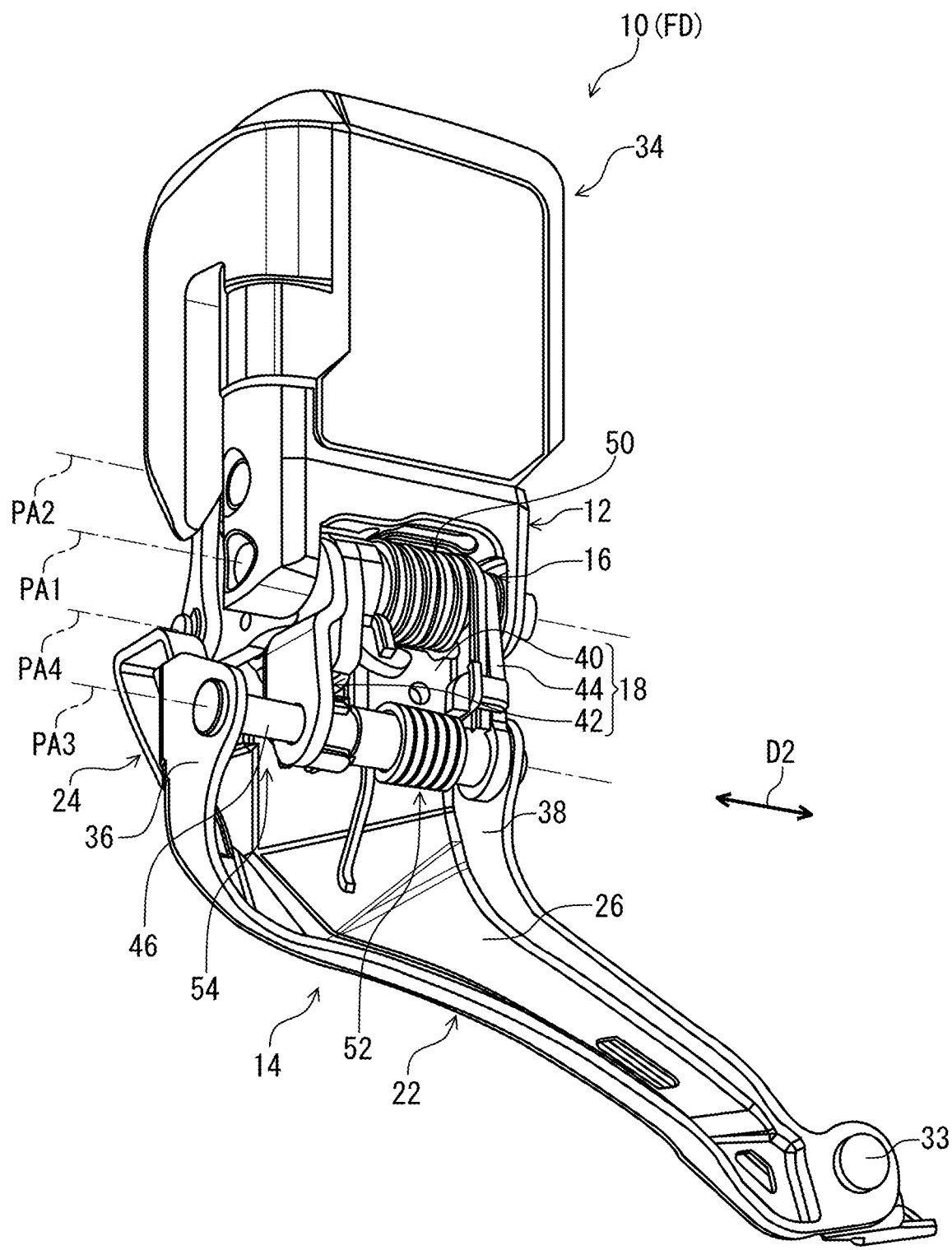
FIG. 6 is a perspective view of the derailleur illustrated in FIG. 2.

As seen in FIG. 6, the first guide protrusion 36 is pivotally coupled to the first link 18 about the first guide pivot axis PA3. The first additional guide protrusion 38 is pivotally coupled to the first link 18 about the first guide pivot axis PA3. The first guide protrusion 36 is pivotally coupled to the first link protrusion 42 about the first guide pivot axis PA3. The first additional guide protrusion 38 is pivotally coupled to the first additional link protrusion 44 about the first guide pivot axis PA3.

The first link protrusion 42 is pivotally coupled to the base member 12 about the first link pivot axis PA1. The first additional link protrusion 44 is pivotally coupled to the base member 12 about the first link pivot axis PA1.

The linkage structure 16 includes a first link pin 46. The first link pin 46 extends along the first guide pivot axis PA3. The first link pin 46 defines the first guide pivot axis PA3. The first link pin 46 is configured to pivotally couple the first guide protrusion 36 to the first link 18 about the first guide pivot axis PA3. The first link pin 46 is configured to pivotally couple the first additional guide protrusion 38 to the first link 18 about the first guide pivot axis PA3. The first link pin 46 is configured to pivotally couple the first guide protrusion 36 to the first link protrusion 42 about the first guide pivot axis PA3. The first link pin 46 is configured to pivotally couple the first additional guide protrusion 38 to the first additional link protrusion 44 about the first guide pivot axis PA3.

The linkage structure 16 includes a first additional link pin 48. The first additional link pin 48 extends along the first link pivot axis PA1. The first additional link pin 48 defines the first link pivot axis PA1. The first additional link pin 48 is configured to pivotally couple the first link protrusion 42 to the base member 12 about the first link pivot axis PAL The first additional link pin 48 is configured to pivotally couple the first additional link protrusion 44 to the base member 12 about the first link pivot axis PA1.

As seen in FIG. 6, the derailleur FD for the human-powered vehicle 2 comprises a biasing member 50. The biasing member 50 is configured to apply biasing force to at least one of the linkage structure 16 and the chain guide 14. The biasing member 50 is configured to bias the chain guide 14 toward the inner-gear position P11 (see e.g., FIG. 3). The biasing member 50 includes a spring such as a torsion coil spring. The biasing member 50 is provided about the first additional link pin 48.

The derailleur FD for the human-powered vehicle 2 comprises a biasing member 52. The biasing member 52 is configured to apply biasing force to at least one of the linkage structure 16 and the chain guide 14. The biasing member 50 is configured to bias the chain guide 14 and the first link 18 to stabilize a relative position between the motor unit 34 and the first link 18. The biasing member 52 includes a spring such as a torsion coil spring. The biasing member 52 is provided about the first link pin 46. The biasing force of the biasing member 50 is larger than the biasing force of the biasing member 52. At least one of the biasing members 50 and 52 can be omitted from the derailleur FD if needed and/or desired.

As seen in FIG. 6, the first guide protrusion 36 is spaced apart from the first link 18 in the axial direction D2 with respect to the first guide pivot axis PA3 to define an intermediate space 54 between the first guide protrusion 36 and the first link 18 in the axial direction D2. The first guide protrusion 36 is spaced apart from the first link protrusion 42 in the axial direction D2 to define the intermediate space 54 between the first guide protrusion 36 and the first link protrusion 42 in the axial direction D2.

In the present embodiment, the intermediate space 54 is free of a spring. The biasing member 50 is provided outside the intermediate space 54. The biasing member 52 is provided outside the intermediate space 54. However, at least one of the biasing members 50 and 52 can be provided in the intermediate space 54 if needed and/or desired.

Figure 7:
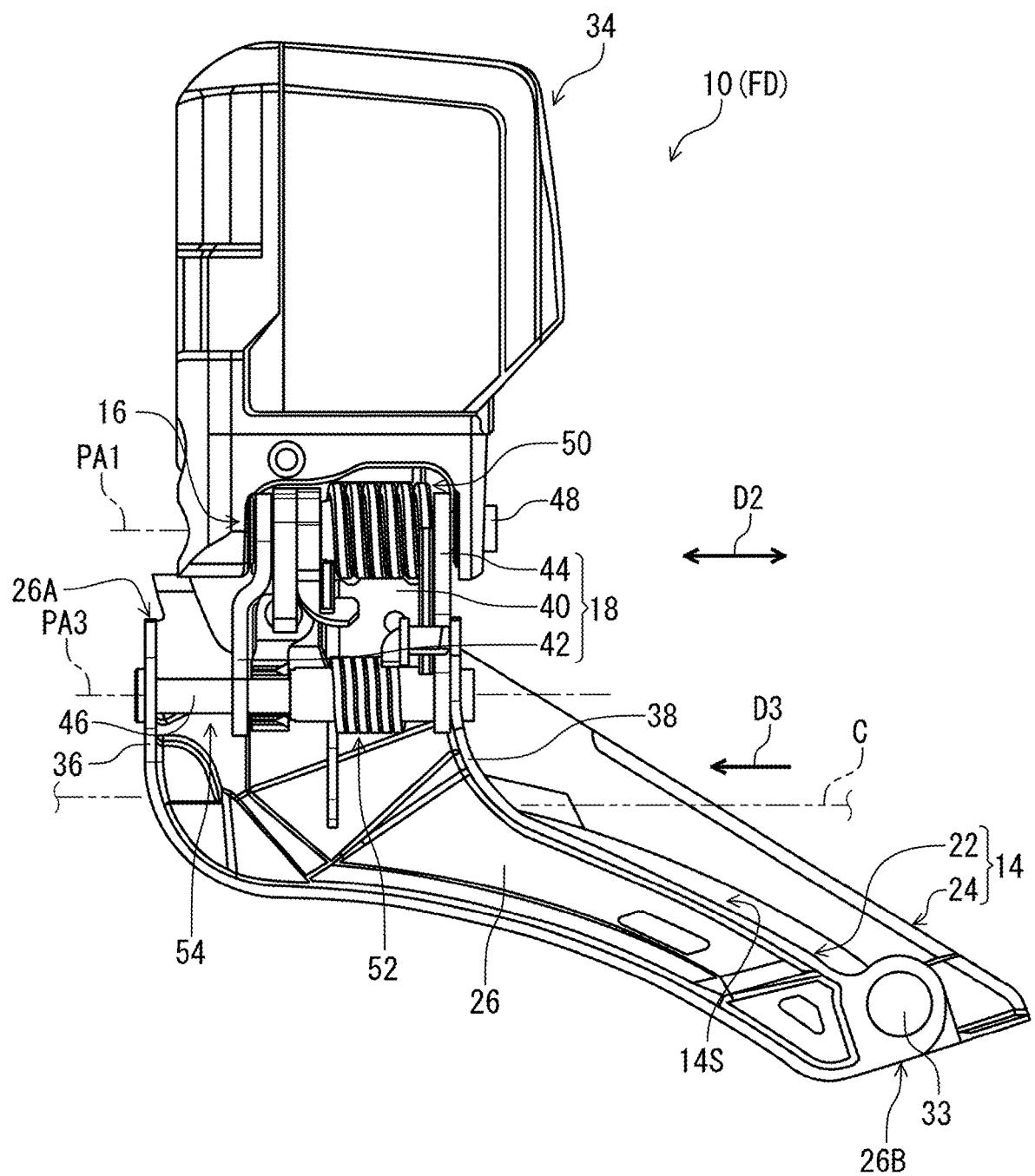
FIG. 7 is another side elevational of the derailleur illustrated in FIG. 2.

As seen in FIG. 7, the intermediate space 54 is provided between the first guide protrusion 36 and the biasing member 50 in the axial direction D2. The intermediate space 54 is provided between the first guide protrusion 36 and the biasing member 52 in the axial direction D2. The intermediate space 54 and the first link protrusion 42 are provided between the first guide protrusion 36 and the biasing member 50 in the axial direction D2. The intermediate space 54 and the first link protrusion 42 are provided between the first guide protrusion 36 and the biasing member 52 in the axial direction D2.

The first link 18 is provided between the first guide protrusion 36 and the first additional guide protrusion 38 in the axial direction D2. The first link protrusion 42 and the first additional link protrusion 44 are provided between the first guide protrusion 36 and the first additional guide protrusion 38 in the axial direction D2. The positional relationships among the intermediate space 54, the first guide protrusion 36, the first additional guide 38, the biasing member 50, the biasing member 52, and the first link protrusion 42 are not limited to the above relationships.

Figure 8:
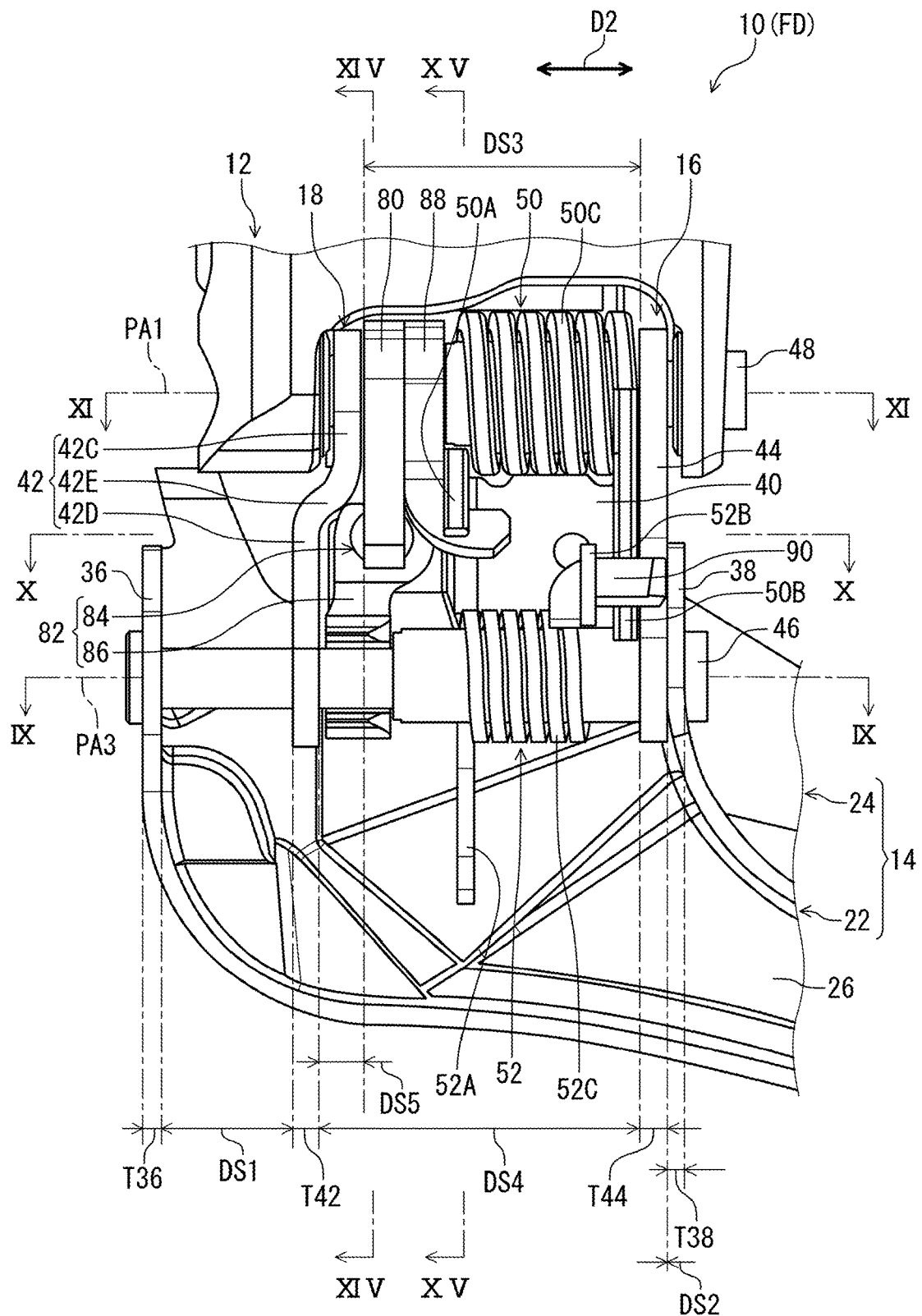
FIG. 8 is an enlarged partial side elevational of the derailleur illustrated in FIG. 2.

As seen in FIG. 8, a first distance DS1 is defined between the first guide protrusion 36 and the first link protrusion 42 in the axial direction D2. A first additional distance DS2 is defined between the first additional guide protrusion 38 and the first additional link protrusion 44 in the axial direction D2. The first distance DS1 is longer than the first additional distance DS2. The first additional distance DS2 is approximately zero. A clearance can be provided between the first additional guide protrusion 38 and the first additional link protrusion 44 in the axial direction D2 if needed and/or desired.

The first guide coupling part 42D is offset from the first link coupling part 42C in the axial direction D2. The first guide coupling part 42D is closer to the first guide protrusion 36 than the first link coupling part 42C in the axial direction D2. However, the first guide coupling part 42D can be provided in the same axial position as that of the first link coupling part 42C in the axial direction D2.

A second distance DS3 is defined between the first link coupling part 42C and the first additional link protrusion 44 in the axial direction D2. A second additional distance DS4 is defined between the first guide coupling part 42D and the first additional link protrusion 44 in the axial direction D2. The second additional distance DS4 is longer than the second distance DS3. However, the second additional distance DS4 can be shorter than or equal to the second distance DS3 if needed and/or desired.

The first guide protrusion 36 has a thickness T36 defined in the axial direction D2. The first additional guide protrusion 38 has a thickness T38 defined in the axial direction D2. The first link protrusion 42 has a thickness T42 defined in the axial direction D2. The first additional link protrusion 44 has a thickness T44 defined in the axial direction D2. The first distance DS1 is longer than the thicknesses T36, T38, T42, and T44. The first additional distance DS2 is shorter than the thicknesses T36, T38, T42, and T44. However, the first distance DS1 can be shorter than or equal to at least one of the thicknesses T36, T38, T42, and T44 if needed and/or desired. The first additional distance DS2 can be longer than or equal to at least one of the thicknesses T36, T38, T42, and T44 if needed and/or desired.

A difference DS5 between the second distance DS3 and the second additional distance DS4 is longer than the thickness T42 of the first link protrusion 42. The first distance DS1 is longer than the difference DS5. However, the difference DS5 can be shorter than or equal to the thickness T42 if needed and/or desired. The first distance DS1 can be shorter than or equal to the difference DS5 if needed and/or desired.

Figure 9:
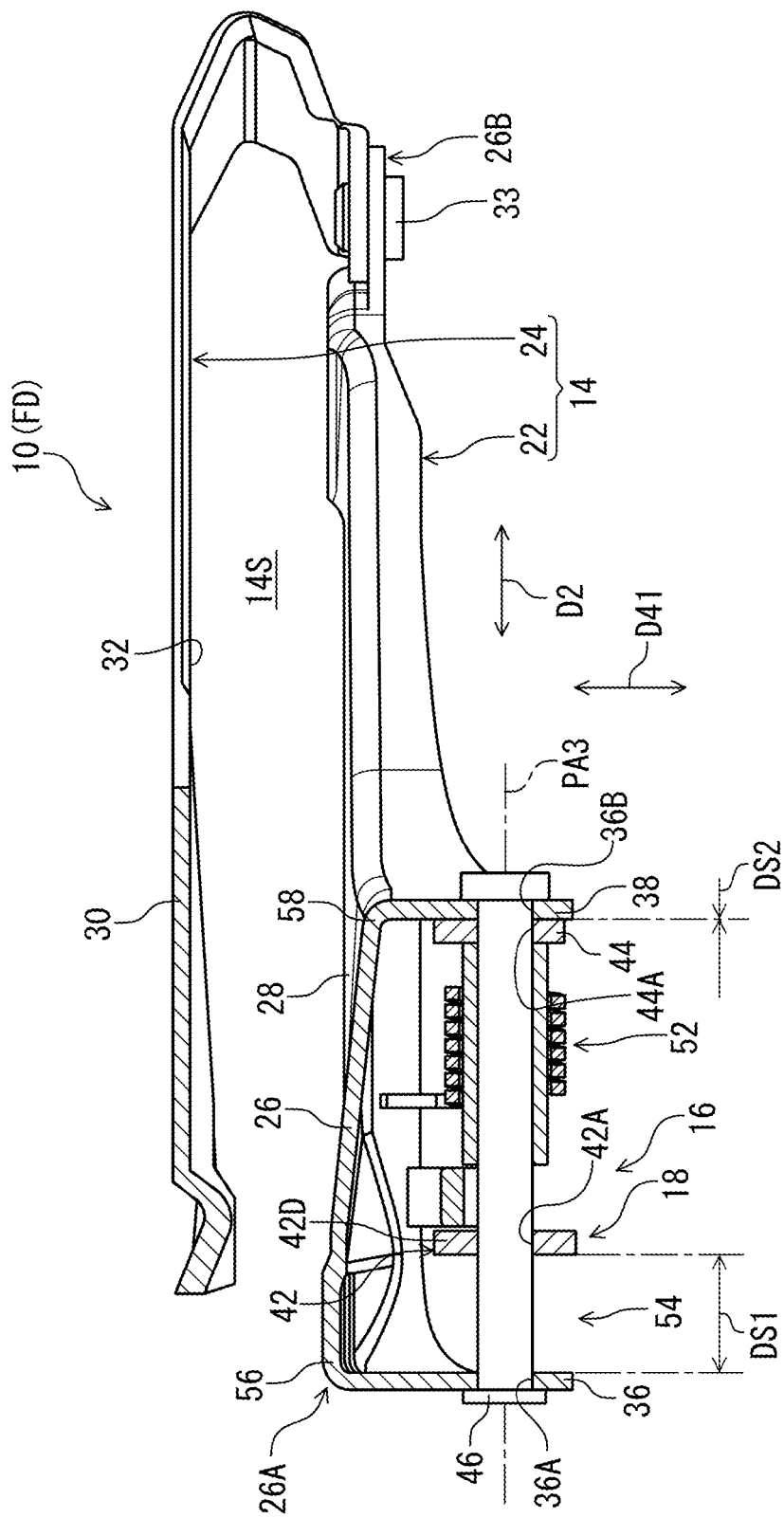
FIG. 9 is a cross-sectional view of the derailleur taken along line IX-IX of FIG. 8.

As seen in FIGS. 7 and 9, the first guide body 26 includes a first outermost end 26A and a first additional outermost end 26B. The first guide body 26 extends between the first outermost end 26A and the first additional outermost end 26B along the first guide surface 28.

In the present embodiment, the first guide protrusion 36 is provided at the first outermost end 26A. The first guide protrusion 36 is closer to the base member 12 than the first additional outermost end 26B. The first guide protrusion 36 is farther from the first additional outermost end 26B than the first additional guide protrusion 38. The first guide protrusion 36 is provided on a front side of the chain guide 14 in a mounting state where the base member 12 is mounted to the human-powered vehicle 2. However, the first guide protrusion 36 can be provided on a rear side of the chain guide 14 in the mounting state if needed and/or desired.

As seen in FIG. 7, the first outermost end 26A is provided on a downstream side relative to the first additional outermost end 26B in a chain-movement direction D3 in which the chain C passes through the chain-guide space 14S. The first guide protrusion 36 is provided on a downstream side relative to the first additional guide protrusion 38 in the chain-movement direction D3. However, the first guide protrusion 36 can be provided on an upstream side relative to the first additional guide protrusion 38 in the chain-movement direction D3 if needed and/or desired.

As seen in FIG. 9, the first guide body 26 includes a first guide-outer edge 56 and a first additional guide-outer edge 58. The first guide-outer edge 56 is spaced apart from the second outer edge in the axial direction D2. The first guide protrusion 36 is provided at the first guide-outer edge 56. The first additional guide protrusion 38 is provided at the first additional guide-outer edge 58. The first guide protrusion 36 extends from the first guide-outer edge 56. The first additional guide protrusion 38 extends from the first additional guide-outer edge 58. The first guide protrusion 36 is formed by bending a plate at the first guide-outer edge 56 in a press working. The first additional guide protrusion 38 is formed by bending a plate at the first additional guide-outer edge 58 in a press working. However, at least one of the first guide protrusion 36 and the first additional guide protrusion 38 can be formed with other working processes if needed and/or desired.

The first guide body 26, the first guide protrusion 36, and the first additional guide protrusion 38 are integrally provided with the second chain guide 24 as a one-piece unitary member. The first guide body 26, the first guide protrusion 36, and the first additional guide protrusion 38 are made of a metallic material. For example, the first guide body 26, the first guide protrusion 36, and the first additional guide protrusion 38 are formed with a press working. However, at least one of the first guide body 26, the first guide protrusion 36, and the first additional guide protrusion 38 can be a separate member from another of the first guide body 26, the first guide protrusion 36, and the first additional guide protrusion 38 if needed and/or desired. The first guide body 26, the first guide protrusion 36, and the first additional guide protrusion 38 can be formed with other working processes if needed and/or desired.

The first guide-outer edge 56 is at least partially provided in the first outermost end 26A. The first additional guide-outer edge 58 is provided between the first guide-outer edge 56 and the first additional outermost end 26B in the axial direction D2.

The first guide protrusion 36 protrudes from the first guide body 26 away from the first guide surface 28 along a first protruding direction D41. The first additional guide protrusion 38 protrudes from the first guide body 26 away from the first guide surface 28 along a first protruding direction D41. In the present embodiment, the first protruding direction D41 is perpendicular to the axial direction D2. However, the first protruding direction D41 can be non-perpendicular to the axial direction D2 if needed and/or desired. The first protruding direction D41 can be inclined relative to the axial direction D2 if needed and/or desired.

The first guide protrusion 36 includes a hole 36A. The first guide coupling part 42D includes the hole 36A. The first additional guide protrusion 38 includes a hole 38A. The first link pin 46 extends through the holes 36A and 38A. The first link protrusion 42 includes a hole 42A. The first additional link protrusion 44 includes a hole 44A. The first link pin 46 extends through the holes 42A and 44A.

As seen in FIG. 4, the first guide-outer edge 56 extends from the first outermost end 26A to the first additional outermost end 26B. The first guide body 26 includes an intermediate end 26C. The intermediate end 26C is provided between the first outermost end 26A and the first additional outermost end 26B in the axial direction D2. The first additional guide-outer edge 58 extends from the intermediate end 26C to the first additional outermost end 26B.

The first guide protrusion 36 is configured to reinforce the first guide body 26. The first additional guide protrusion 38 is configured to reinforce the first guide body 26. Thus, the first guide protrusion 36 can also be referred to as a first guide reinforcement rib or tab 36. The first additional guide protrusion 38 can also be referred to as a first additional guide reinforcement rib or tab 38.

The first guide body 26 includes at least one opening 26D. In the present embodiment, the first guide body 26 includes a plurality of openings 26D. The first additional outermost end 26B is closer to the plurality of openings 26D than the first outermost end 26A. The first additional outermost end 26B is closer to the plurality of openings 26D than the intermediate end 26C. At least one of the openings 26D can be omitted from the first guide body 26 if needed and/or desired.

Figure 10:
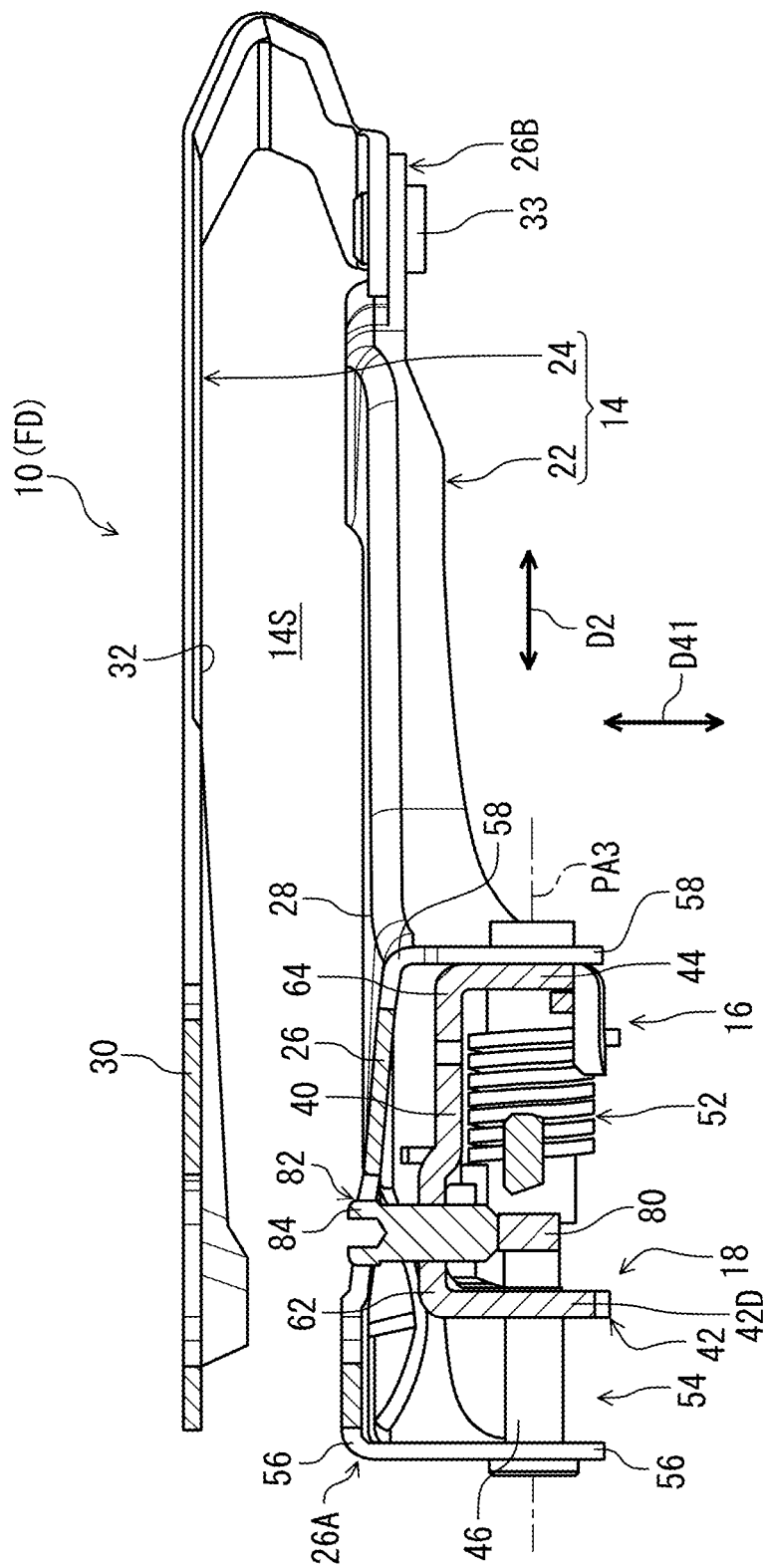
FIG. 10 is a cross-sectional view of the derailleur taken along line X-X of FIG. 8.

As seen in FIG. 10, the first link body 40 includes a first link-outer edge 62 and a first additional link-outer edge 64. The first link-outer edge 62 is spaced apart from the second outer edge in the axial direction D2. The first link protrusion 42 is provided at the first link-outer edge 62. The first additional link protrusion 44 is provided at the first additional link-outer edge 64. The first link protrusion 42 extends from the first link-outer edge 62. The first additional link protrusion 44 extends from the first additional link-outer edge 64. The first link protrusion 42 is formed by bending a plate at the first link-outer edge 62. The first additional link protrusion 44 is formed by bending a plate at the first additional link-outer edge 64.

The first link protrusion 42 extends from the first link body 40 along the first protruding direction D41. The first additional link protrusion 44 extends from the first link body 40 along the first protruding direction D41.

The first link body 40, the first link protrusion 42, and the first additional link protrusion 44 are integrally provided with each other as a one-piece unitary member. The first link body 40, the first link protrusion 42, and the first additional link protrusion 44 are made of a metallic material. For example, the first link body 40, the first link protrusion 42, and the first additional link protrusion 44 are formed with press working. However, at least one of the first link body 40, the first link protrusion 42, and the first additional link protrusion 44 can be a separate member from another of the first link body 40, the first link protrusion 42, and the first additional link protrusion 44 if needed and/or desired.

Figure 11:
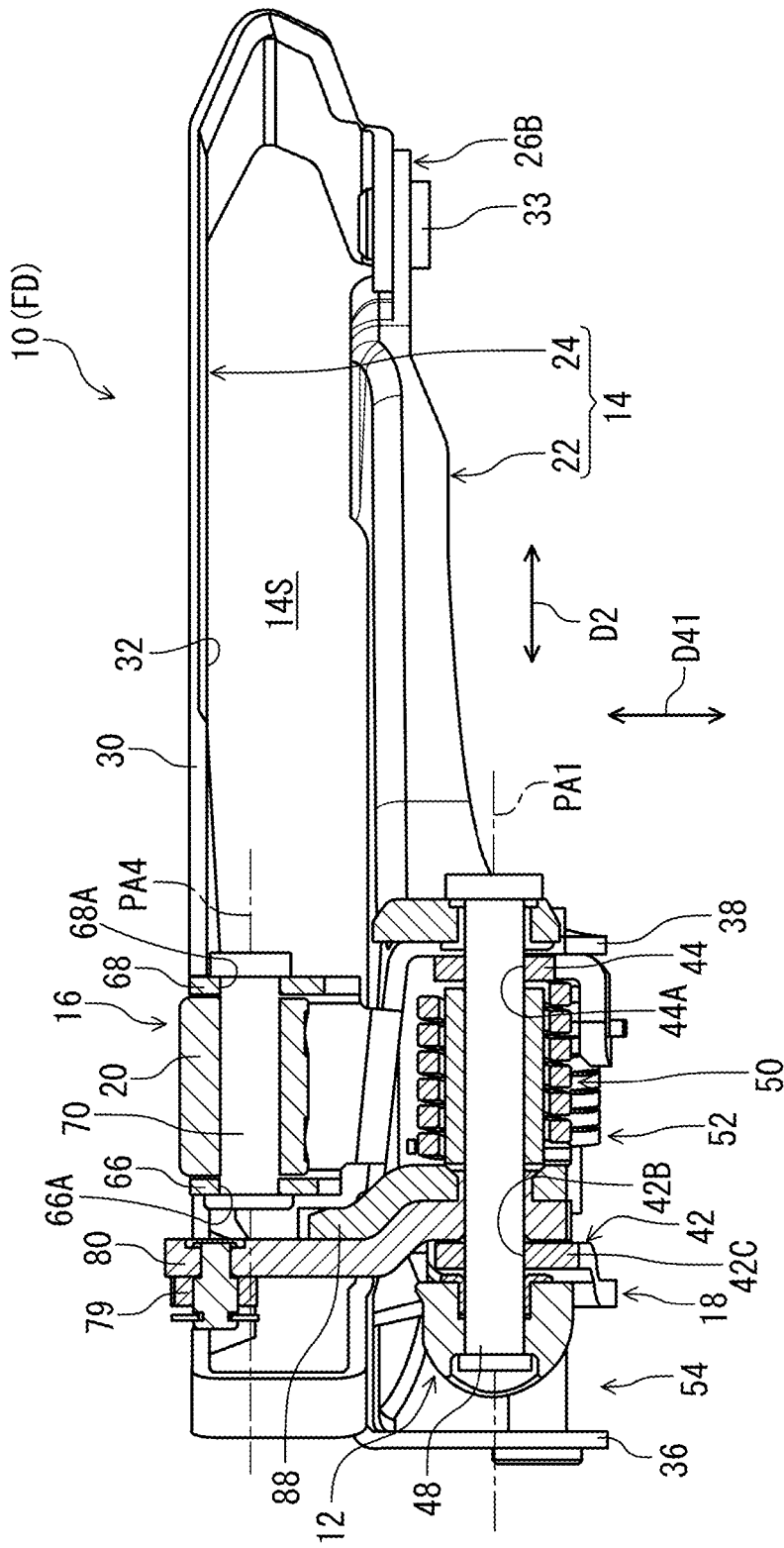
FIG. 11 is a cross-sectional view of the derailleur taken along line XI-XI of FIG. 8.

As seen in FIG. 11, the first link protrusion 42 includes a hole 42B. The first link coupling part 42C includes the hole 42B. The first additional link protrusion 44 includes a hole 44B. The first additional link pin 48 extends through the holes 42B and 44B.

Figure 12:
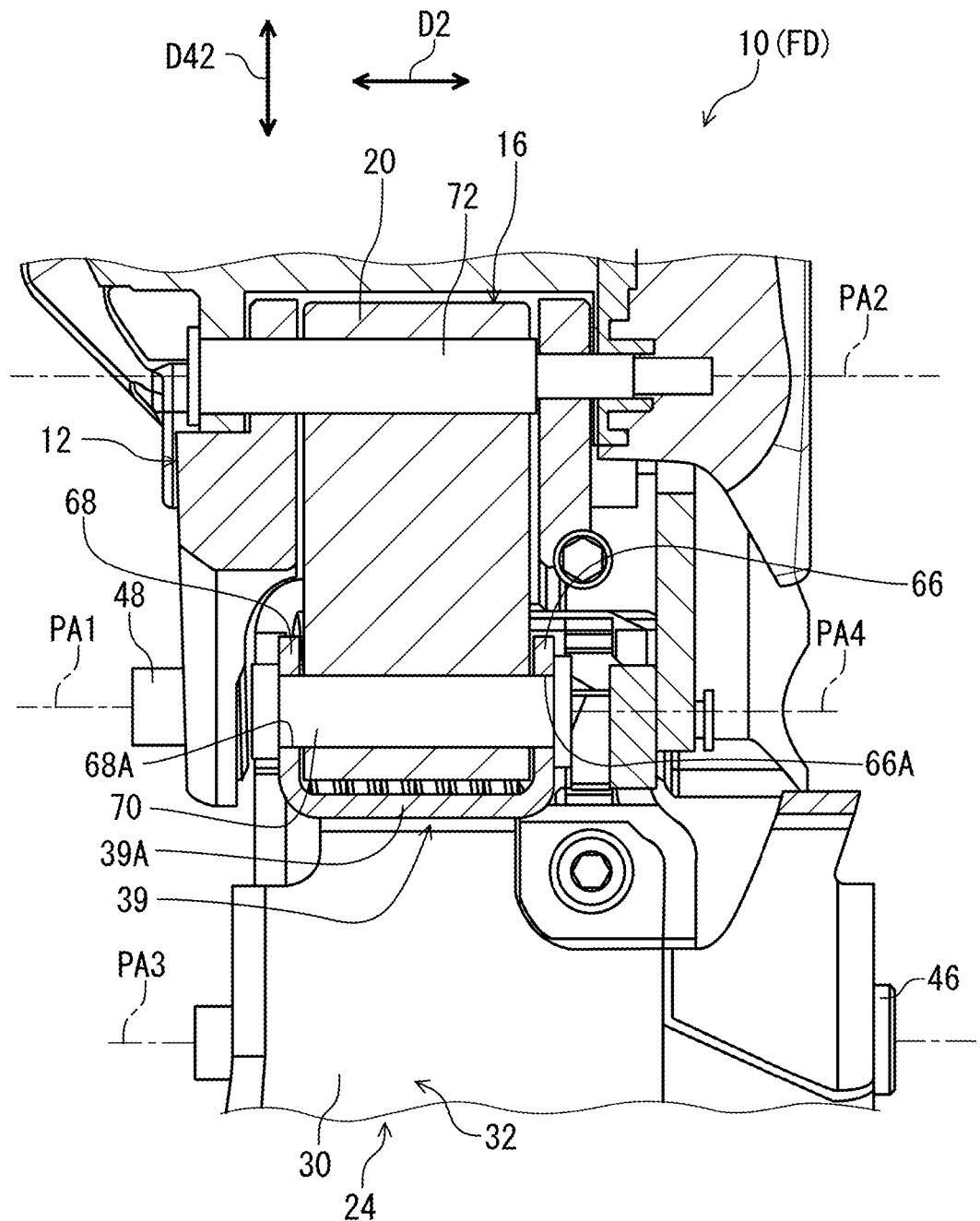
FIG. 12 is a cross-sectional view of the derailleur taken along line XII-XII of FIG. 3.

As seen in FIG. 12, the second chain guide 24 includes a second guide protrusion 66. The second guide protrusion 66 protrudes from the first coupling body 39A of the coupling body 39. The second guide protrusion 66 is pivotally coupled to the second link 20 about the second guide pivot axis PA4. The second chain guide 24 includes a second additional guide protrusion 68. The second additional guide protrusion 68 protrudes from the first coupling body 39A of the coupling body 39. The second additional guide protrusion 68 is pivotally coupled to the second link 20 about the second guide pivot axis PA4. The second additional guide protrusion 68 is spaced apart from the second guide protrusion 66 in the axial direction D2.

The second guide protrusion 66 extends from the second guide body 30 in a second protruding direction D42. The second additional guide protrusion 68 extends from the second guide body 30 in the second protruding direction D42. In the present embodiment, the second protruding direction D42 is perpendicular to the axial direction D2. However, the second protruding direction D42 can be non-perpendicular to the axial direction D2 if needed and/or desired. The second protruding direction D42 can be inclined relative to the axial direction D2 if needed and/or desired.

As seen in FIG. 4, the second guide body 30 extends along the second protruding direction D42. The first guide body 26 extends along the second protruding direction D42. The second protruding direction D42 is different from the first protruding direction D41. The second protruding direction D42 is perpendicular to the first protruding direction D41. However, the second protruding direction D42 can be non-perpendicular to the first protruding direction D41 if needed and/or desired. The second protruding direction D42 can be parallel to the first protruding direction D41 if needed and/or desired.

As seen in FIG. 12, the first coupling body 39A of the coupling body 39, the second guide protrusion 66, and the second additional guide protrusion 68 are integrally provided with each other. The coupling body 39, the second guide protrusion 66, and the second additional guide protrusion 68 are made of a metallic material. For example, the coupling body 39, the second guide protrusion 66, and the second additional guide protrusion 68 are formed with a press working. However, at least one of the second guide body 30, the second guide protrusion 66, and the second additional guide protrusion 68 can be a separate member from another of the second guide body 30, the second guide protrusion 66, and the second additional guide protrusion 68 if needed and/or desired. The second guide body 30, the second guide protrusion 66, and the second additional guide protrusion 68 can be formed with other working processes.

The linkage structure 16 includes a second link pin 70. The second link pin 70 extends along the second guide pivot axis PA4. The second link pin 70 defines the second guide pivot axis PA4. The second link pin 70 is configured to pivotally couple the second guide protrusion 66 to the second link 20 about the second guide pivot axis PA4. The second link pin 70 is configured to pivotally couple the second additional guide protrusion 68 to the second link 20 about the second guide pivot axis PA4.

The second guide protrusion 66 includes a hole 66A. The second additional guide protrusion 68 includes a hole 68A. The second link pin 70 extends through the holes 66A and 68A.

The linkage structure 16 includes a second additional link pin 72. The second additional link pin 72 extends along the second link pivot axis PA2. The second additional link pin 72 defines the second link pivot axis PA2. The second additional link pin 72 is configured to pivotally couple the second link 20 to the base member 12 about the second link pivot axis PA2. The second additional link pin 72 is configured to pivotally couple the second link 20 to the base member 12 about the second link pivot axis PA2.

Figure 13:
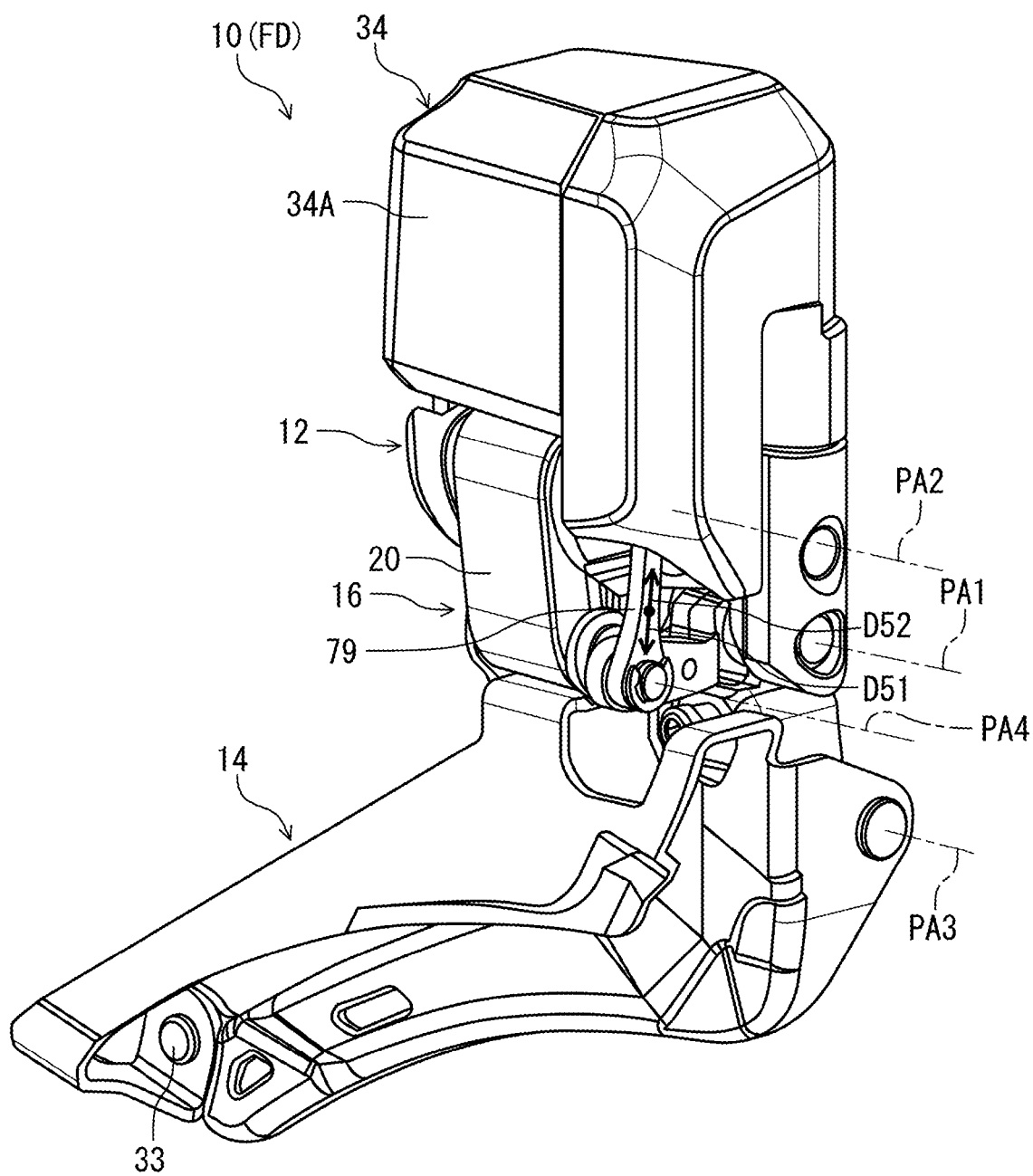
FIG. 13 is a perspective view of the derailleur illustrated in FIG. 2.

As seen in FIG. 13, the motor unit 34 includes a cover 34A, a motor, and a gear structure. The cover 34A is configured to be detachably attached to the base member 12. The motor and the gear structure are provided in the cover 34A. The motor is configured to generate rotational force. The gear structure is configured to convert the rotational force to the actuation force. The gear structure is configured to transmit the actuation force to at least one of the chain guide 14 and the linkage structure 16. The gear structure is configured to maintain the position of the chain guide 14 in a state where the motor generates no rotational force. For example, the gear structure includes a worm gear and/or a torque diode.

In the present embodiment, the derailleur FD further comprises an output member 79. The motor unit 34 is configured to move the output member 79 relative to the base member 12 in each of a first direction D51 and a second direction D52. The chain guide 14 is moved relative to the base member 12 from the outer-gear position P12 toward the inner-gear position P11 in the inward-shifting direction D11 (see e.g., FIG. 3) when the motor unit 34 moves the output member 79 in the first direction D51. The chain guide 14 is moved relative to the base member 12 from the inner-gear position P11 toward the outer-gear position P12 in the outward-shifting direction D12 (see e.g., FIG. 3) when the motor unit 34 moves the output member 79 in the second direction D52. The structures of the motor unit 34 and the output member 79 are not limited to the above structure.

Figure 14:
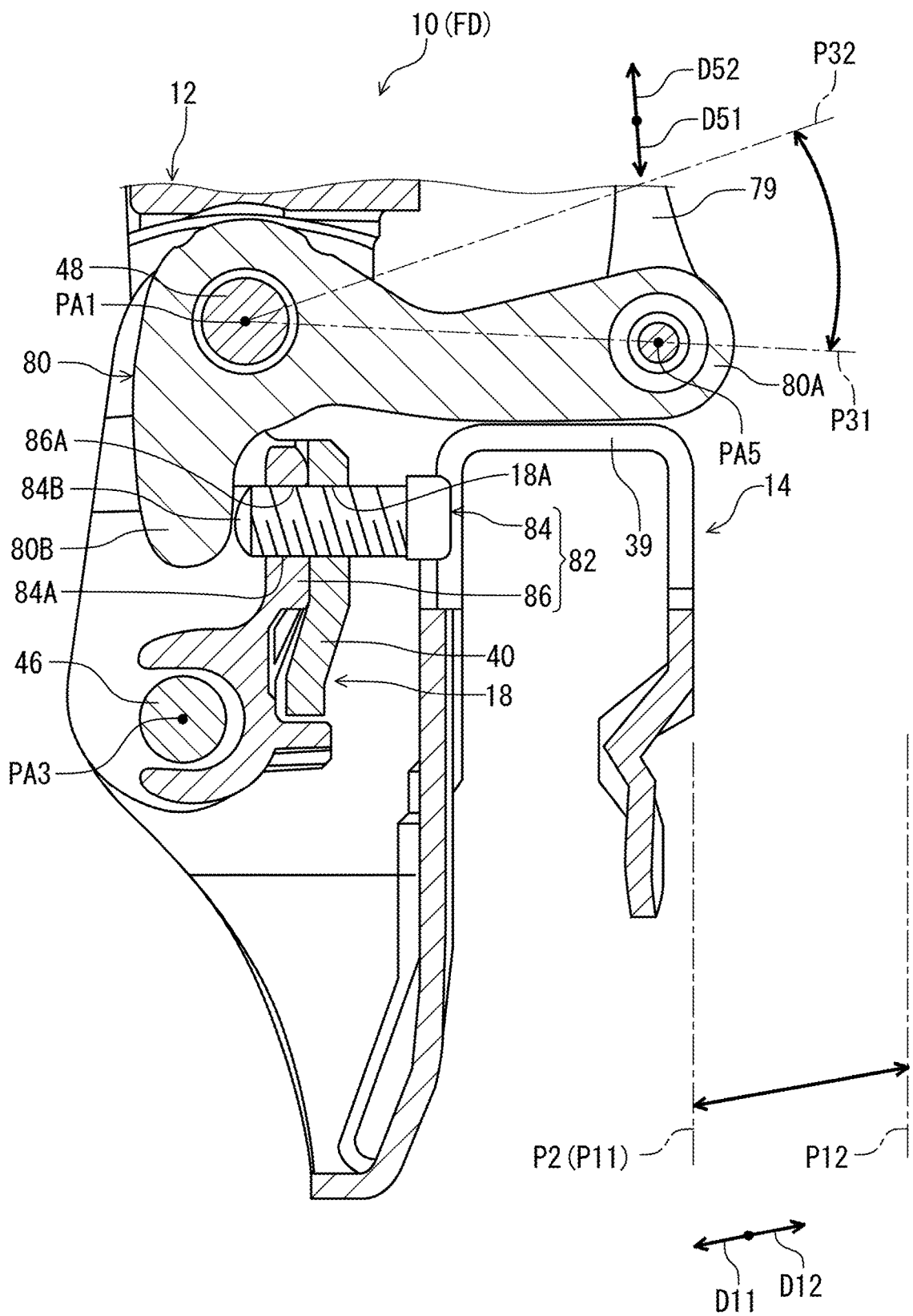
FIG. 14 is a cross-sectional view of the derailleur taken along line XIV-XIV of FIG. 8.

As seen in FIG. 14, the derailleur FD further comprises a transmitting member 80. The transmitting member 80 is configured to transmit actuation force to the linkage structure 16. The transmitting member 80 includes a first longitudinal end 80A and a second longitudinal end 80B. The first longitudinal end 80A of the transmitting member 80 is pivotally coupled to a longitudinal end of the output member 79 about a pivot axis PA5. The transmitting member 80 is pivotally coupled to the first additional link pin 48 about the first link pivot axis PA1. The first link pivot axis PA1 is provided between the first longitudinal end 80A and the second longitudinal end 80B.

The transmitting member 80 is pivotable relative to the base member 12 about the first link pivot axis PA1 between a first pivot position P31 and a second pivot position P32.

The transmitting member 80 is moved from the first pivot position P31 toward the second pivot position P32 when the output member 79 is moved in the second direction D52. The transmitting member 80 is moved from the second pivot position P32 toward the first pivot position P31 when the output member 79 is moved in the first direction D51. The chain guide 14 is in the inner-gear position P11 in a first state where the transmitting member 80 is in the first pivot position P31. The chain guide 14 is in the outer-gear position P12 in a second state where the transmitting member 80 is in the second pivot position P32.

The derailleur FD further comprises an adjustment structure 82. The adjustment structure 82 is configured to change an end position P2 of chain guide 14. In the present embodiment, the end position P2 is the inner-gear position P11. Thus, the adjustment structure 82 is configured to change the inner-gear position P11 of chain guide 14. However, the adjustment structure 82 can be configured to change the outer-gear position P12 of chain guide 14 if needed and/or desired.

The adjustment structure 82 includes an adjustment screw 84 and an adjustment support 86. The adjustment support 86 is pivotally coupled to the first link pin 46 and includes a support hole 86A. The adjustment screw 84 extends through the support hole 86A.

The first link 18 includes a threaded hole 18A. The adjustment screw 84 includes an external threaded part 84A and a contact end 84B. The external threaded part 84A is threadedly engaged with the threaded hole 18A. The support hole 86A of the adjustment support 86 includes a threaded hole. The external threaded part 84A is threadedly engaged with the threaded hole of the support hole 86A. The contact end 84B is configured to be in contact with the transmitting member 80 to position the chain guide 14 in the end position P2.

Rotation of the adjustment screw 84 changes the position of the first link 18 relative to the transmitting member 80, changing the end position P2 (e.g., the inner-gear position P11) in the first state where the transmitting member 80 is in the first pivot position P31. However, the adjustment structure 82 can be omitted from the derailleur FD if needed and/or desired. In such embodiments, for example, the transmitting member 80 is configured to be in contact with the first link 18 of the linkage structure 16.

Figure 15:
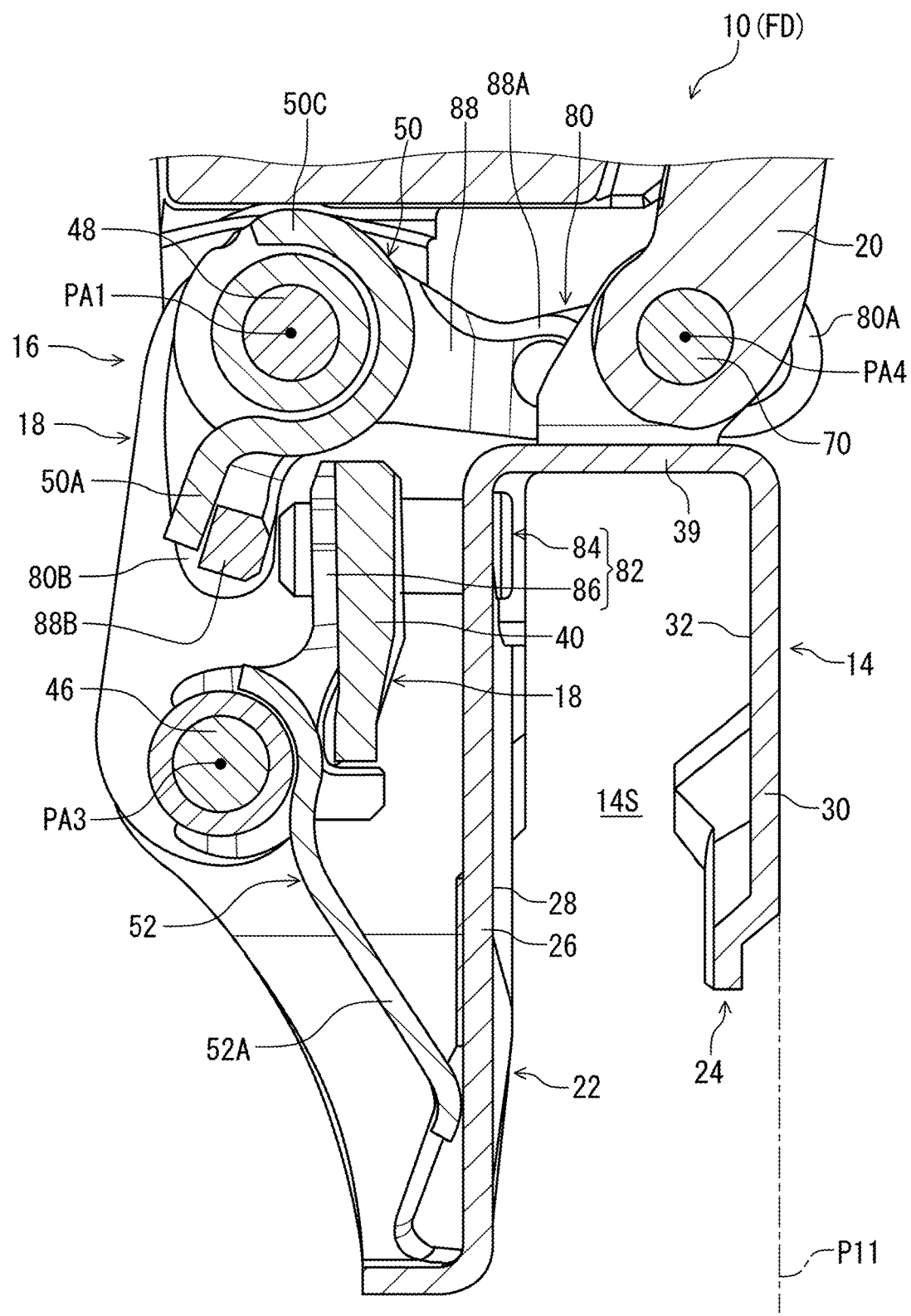
FIG. 15 is a cross-sectional view of the derailleur taken along line XV-XV of FIG. 8.

As seen in FIG. 15, the derailleur FD further comprises a first support 88. The first support 88 is secured to the transmitting member 80 to pivot relative to the base member 12 about the first link pivot axis PA1 along with the transmitting member 80.

The first support 88 includes a first end 88A and a second end 88B. The first end 88A of the first support 88 is secured to the transmitting member 80. The second end 88B of the first support 88 is engaged with the biasing member 50. The first link pivot axis PA1 is provided between the first end 88A and the second end 88B.

Figure 16:
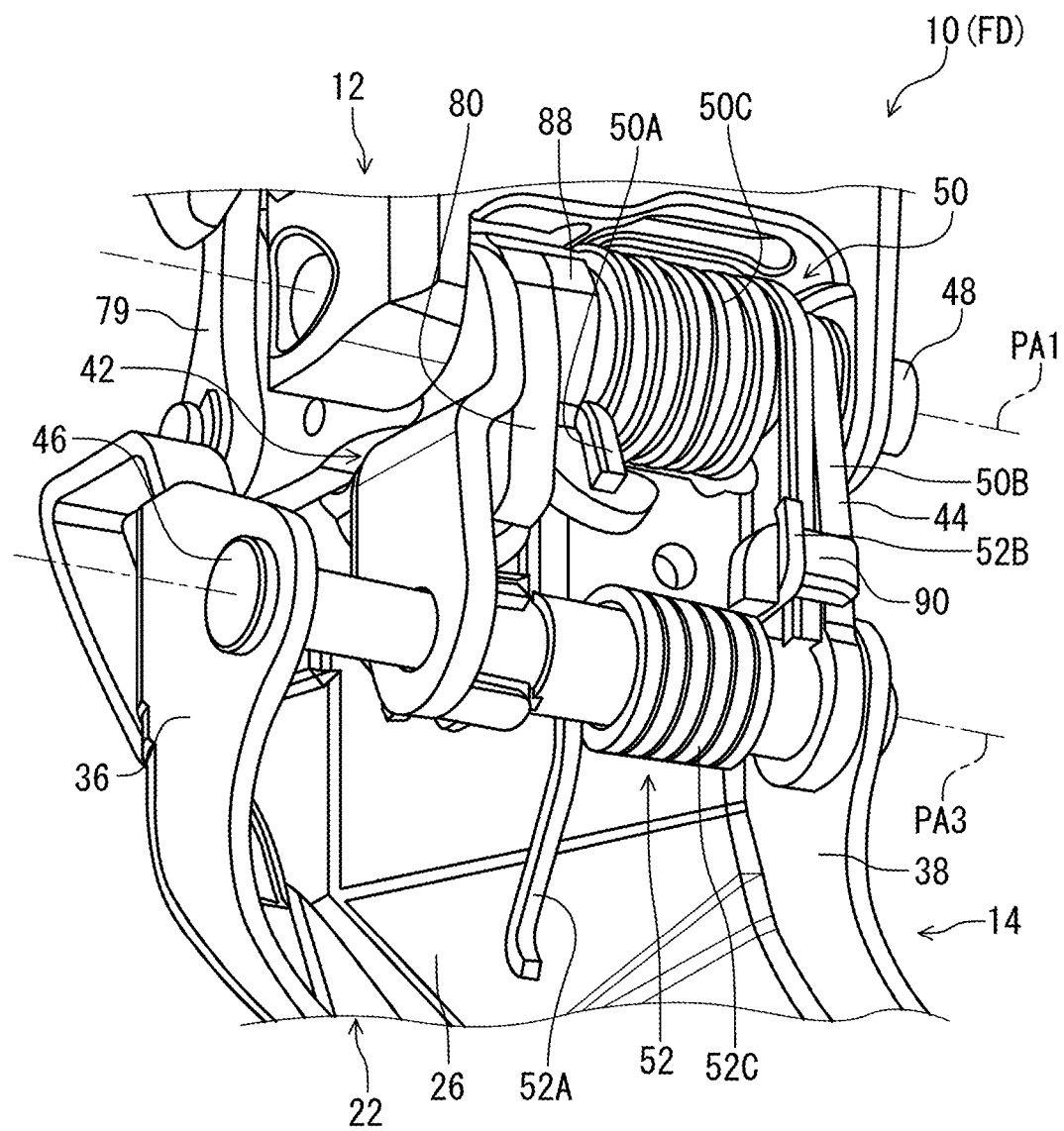
FIG. 16 is an enlarged partial perspective view of the derailleur illustrated in FIG. 2.

As seen in FIG. 16, the derailleur FD further comprises a second support 90. The second support 90 is secured to the first additional link protrusion 44 of the first link 18. The biasing member 50 includes a first end 50A, a second end 50B, and a coiled body 50C. The first end 50A of the biasing member 50 is engaged with the first support 88. The second end 50B of the biasing member 50 is engaged with the second support 90. The biasing member 50 is configured to bias the transmitting member 80 and the first link 18 such that the second longitudinal end 80B (see e.g., FIG. 12) of the transmitting member 80 keeps in contact with the adjustment screw 84 (see e.g., FIG. 12) of the adjustment structure 82.

The biasing member 52 includes a first end 52A, a second end 52B, and a coiled body 52C. The first end 52A of the biasing member 52 is engaged with the chain guide 14 (e.g., the first guide body 26 of the first chain guide 22). The second end 52B of the biasing member 52 is engaged with the second support 90.

Second Embodiment

A derailleur 210 in accordance with a second embodiment will be described below referring to FIGS. 17 to 19. The derailleur 210 has the same structure and/or configuration as those of the derailleur 10 except for the linkage structure 16. Thus, elements having substantially the same function as those in the present embodiment will be numbered the same here and will not be described and/or illustrated again in detail here for the sake of brevity.

Figure 17:
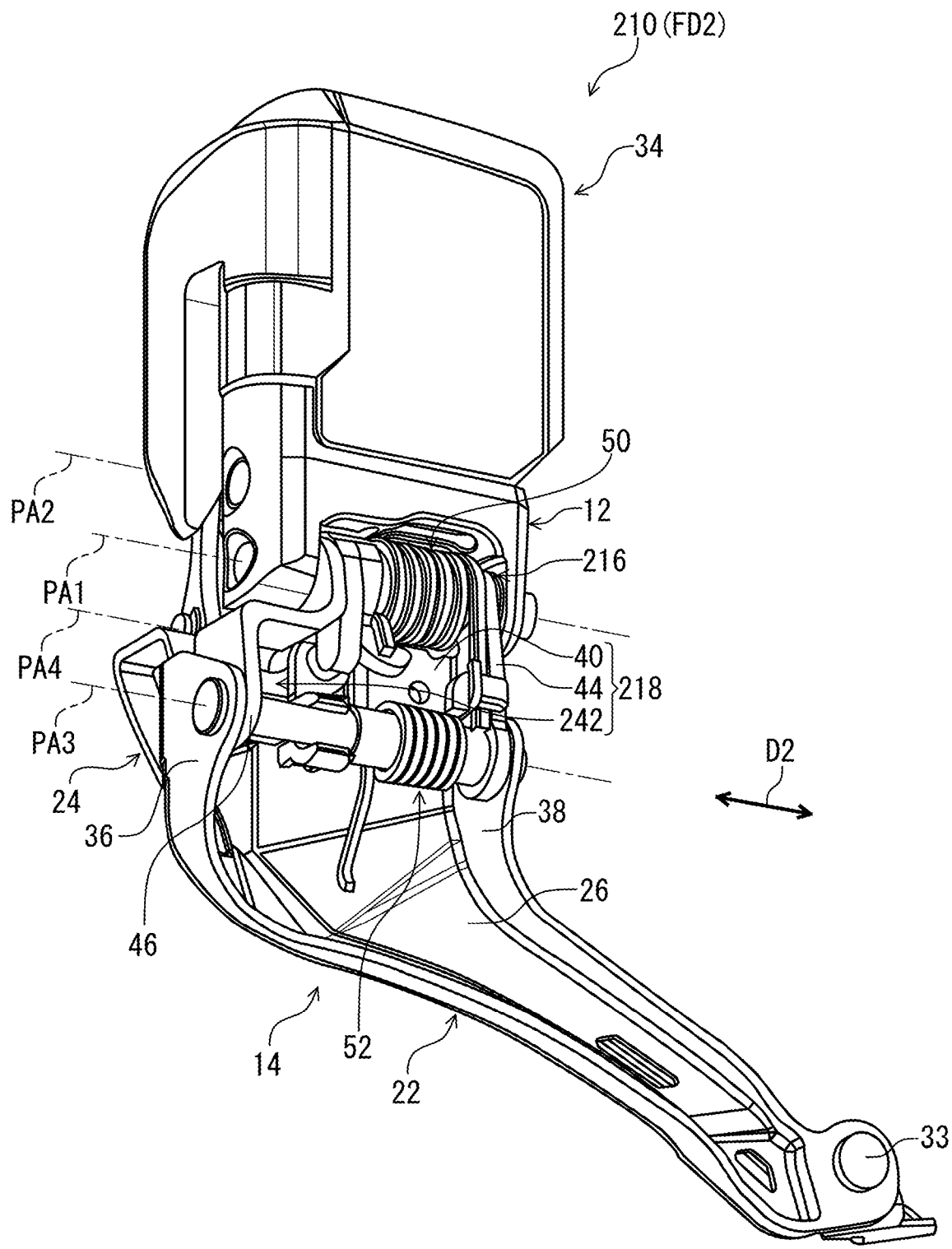
FIG. 17 is a perspective view of a derailleur in accordance with a second embodiment.

As seen in FIG. 17, the derailleur 210 includes a derailleur FD2. The derailleur FD2 for the human-powered vehicle 2 comprises the base member 12, the chain guide 14, and a linkage structure 216. The derailleur FD2 for the human-powered vehicle 2 comprises the motor unit 34. The linkage structure 216 is configured to movably couple the chain guide 14 to the base member 12. The linkage structure 216 has substantially the same structure as the structure of the linkage structure 16 of the first embodiment. The linkage structure 216 includes the linkage structure 216 includes a first link 218. The first link 218 is pivotally coupled to the base member 12 about the first link pivot axis PA1. The first link 218 includes a first link body 40 and a first link protrusion 242. The first link protrusion 242 protrudes from the first link body 40. The first link 218 includes the first additional link protrusion 44. The first additional link protrusion 44 is spaced apart from the first link protrusion 242 in the axial direction D2. In the present embodiment, the first guide protrusion 36 and the first link protrusion 242 do not define the intermediate space 54 of the first embodiment between the first guide protrusion 36 and the first link protrusion 242.

The first guide protrusion 36 is pivotally coupled to the first link protrusion 242 about the first guide pivot axis PA3. The first additional guide protrusion 38 is pivotally coupled to the first additional link protrusion 44 about the first guide pivot axis PA3. The first link protrusion 242 is pivotally coupled to the base member 12 about the first link pivot axis PA1. The first additional link protrusion 44 is pivotally coupled to the base member 12 about the first link pivot axis PA1. The first guide coupling part 242D is pivotally coupled to the first guide protrusion 36 about the first guide pivot axis PA3.

Figure 18:
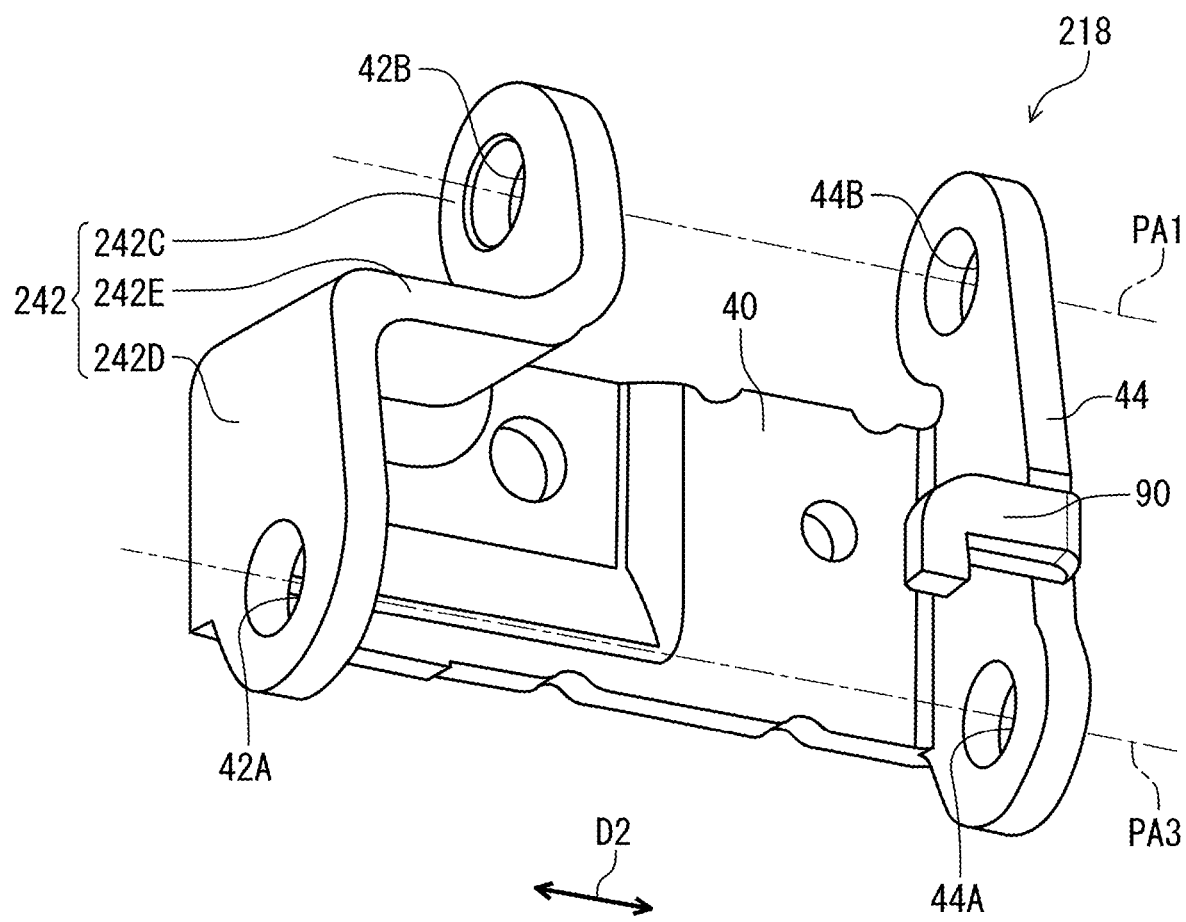
FIG. 18 is a perspective view of a first link of the derailleur illustrated in FIG. 17.

As seen in FIG. 18, the first link protrusion 242 includes a first link coupling part 242C and a first guide coupling part 242D. The first link coupling part 242C is pivotally coupled to the base member 12 about the first link pivot axis PA1. The first link coupling part 242C includes the hole 42B. The first guide coupling part 242D includes the hole 42A.

The first link protrusion 242 includes an intermediate part 242E. The intermediate part 242E extends from the first link coupling part 242C to the first guide coupling part 242D. The intermediate part 242E couples the first link coupling part 242C to the first guide coupling part 242D. The intermediate part 242E extends along the first guide pivot axis PA3.

Figure 19:
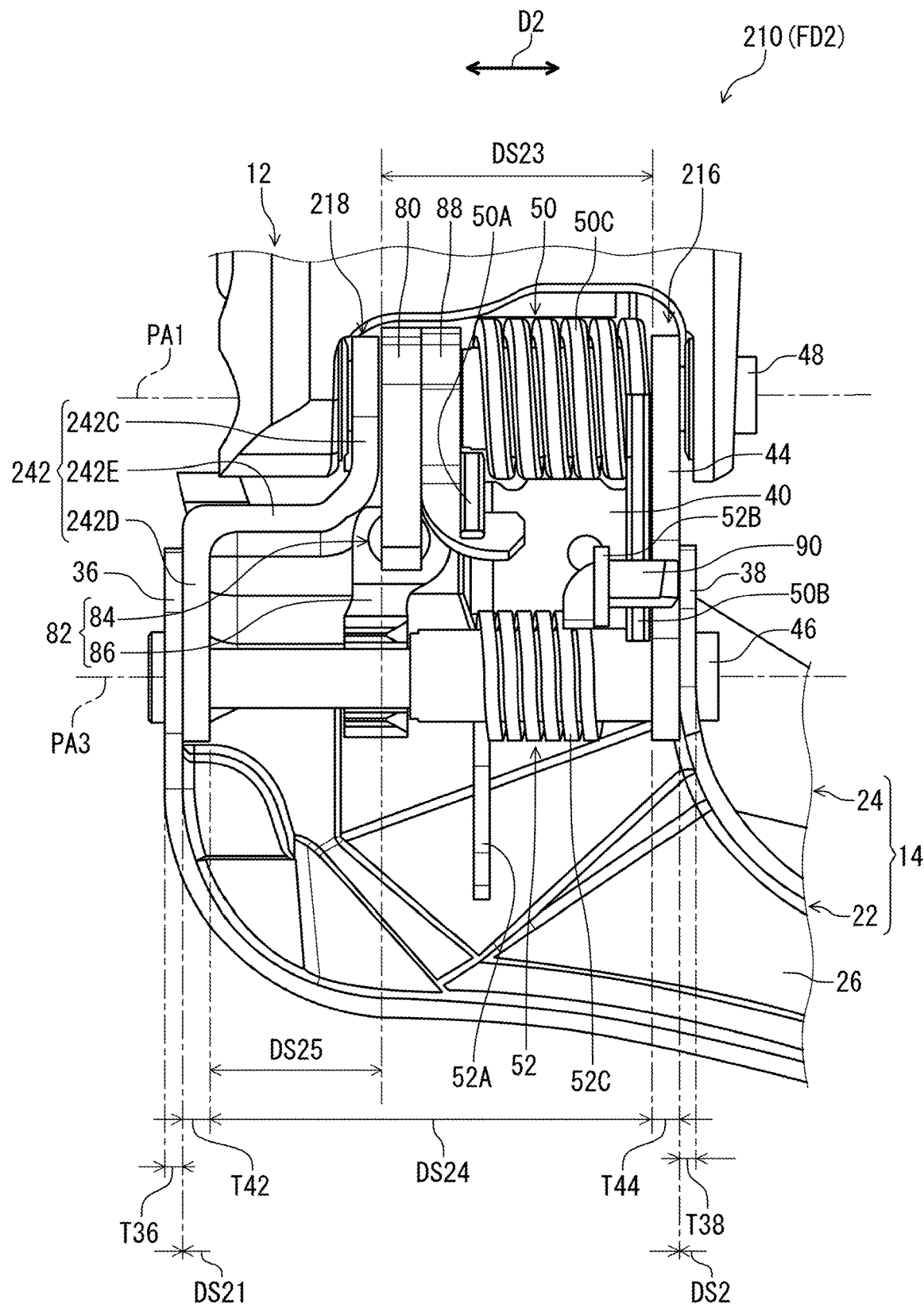
FIG. 19 is an enlarged partial side elevational of the derailleur illustrated in FIG. 17.

As seen in FIG. 19, the first guide coupling part 242D is offset from the first link coupling part 242C in the axial direction D2. The first guide coupling part 242D is closer to the first guide protrusion 36 than the first link coupling part 242C in the axial direction D2.

A first distance DS21 is defined between the first guide protrusion 36 and the first link protrusion 242 in the axial direction D2. The first distance DS21 is substantially equal to the first additional distance DS2. The first distance DS21 is approximately zero.

A second distance DS23 is defined between the first link coupling part 242C and the first additional link protrusion 44 in the axial direction D2. A second additional distance DS24 is defined between the first guide coupling part 242D and the first additional link protrusion 44 in the axial direction D2. The second additional distance DS24 is longer than the second distance D23.

A difference DS25 between the second distance DS23 and the second additional distance DS24 is longer than the thickness T42 of the first link protrusion 42. The first distance DS21 is longer than the difference DS25.

In the present application, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have," "include" and their derivatives.

The terms "member," "section," "portion," "part," "element," "body" and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element," and the term "second element" itself does not imply an existence of "first element."

The term "pair of," as used herein, can encompass the configuration in which the pair of elements have different shapes or structures from each other in addition to the configuration in which the pair of elements have the same shapes or structures as each other.

The terms "a" (or "an"), "one or more" and "at least one" can be used interchangeably herein.

The phrase "at least one of" as used in this disclosure means "one or more" of a desired choice. For one example, the phrase "at least one of" as used in this disclosure means "only one single choice" or "both of two choices" if the number of its choices is two. For other example, the phrase "at least one of" as used in this disclosure means "only one single choice" or "any combination of equal to or more than two choices" if the number of its choices is equal to or more than three. For instance, the phrase "at least one of A and B" encompasses (1) A alone, (2), B alone, and (3) both A and B. The phrase "at least one of A, B, and C" encompasses (1) A alone, (2), B alone, (3) C alone, (4) both A and B, (5) both B and C, (6) both A and C, and (7) all A, B, and C. In other words, the phrase "at least one of A and B" does not mean "at least one of A and at least one of B" in this disclosure.

Finally, terms of degree such as "substantially," "about" and "approximately" as used herein mean a reasonable amount of deviation of the modified twin such that the end result is not significantly changed. All of numerical values described in the present application can be construed as including the terms such as "substantially," "about" and "approximately."

Obviously, numerous modifications and variations of the present invention are possible in light of the above teachings. It is therefore to be understood that within the scope of the appended claims, the invention may be practiced otherwise than as specifically described herein.

What is claimed is:

1. A derailleur for a human-powered vehicle, comprising:
a base member configured to be mounted to the human-powered vehicle;
a chain guide movable relative to the base member;
a linkage structure configured to movably couple the chain guide to the base member; and
a biasing member configured to apply biasing force to at least one of the linkage structure and the chain guide,
the linkage structure including a first link pivotally coupled to the base member about a first link pivot axis,
the chain guide including a first chain guide pivotally coupled to the first link about a first guide pivot axis spaced apart from the first link pivot axis, the first chain guide including
a first guide body including a first guide surface configured to be in contact with a chain, and
a first guide protrusion protruding from the first guide body and pivotally coupled to the first link about the first guide pivot axis, the first guide protrusion being spaced apart from the first link in an axial direction with respect to the first guide pivot axis to define an intermediate space between the first guide protrusion and the first link in the axial direction, the intermediate space being free of a spring, and
the intermediate space is provided between the first guide protrusion and the biasing member in the axial direction.

2. The derailleur according to claim 1, wherein the biasing member is provided outside the intermediate space.

3. The derailleur according to claim 1, wherein the first guide protrusion is provided on a front side of the chain guide in a mounting state where the base member is mounted to the human-powered vehicle.

4. The derailleur according to claim 1, wherein the first link includes a first link body and a first link protrusion protruding from the first link body,
the first guide protrusion is pivotally coupled to the first link protrusion about the first guide pivot axis, and
the first guide protrusion is spaced apart from the first link protrusion in the axial direction to define the intermediate space between the first guide protrusion and the first link protrusion in the axial direction.

5. The derailleur according to claim 4, wherein the intermediate space and the first link protrusion are provided between the first guide protrusion and the biasing member in the axial direction.

6. The derailleur according to claim 4, wherein the first guide body includes a first outermost end and a first additional outermost end and extends between the first outermost end and the first additional outermost end along the first guide surface, and
the first guide protrusion is provided at the first outermost end.

7. The derailleur according to claim 6, wherein the first guide protrusion is closer to the base member than the first additional outermost end.

8. The derailleur according to claim 6, wherein
the first chain guide includes a first additional guide protrusion protruding from the first guide body, the first additional guide protrusion being spaced apart from the first guide protrusion in the axial direction, and
the first guide protrusion is farther from the first additional outermost end than the first additional guide protrusion.

9. A derailleur for a human-powered vehicle, comprising:
a base member configured to be mounted to the human-powered vehicle;
a chain guide movable relative to the base member; and
a linkage structure configured to movably couple the chain guide to the base member, wherein the linkage structure includes a first link pivotally coupled to the base member about a first link pivot axis,
the chain guide includes a first chain guide pivotally coupled to the first link about a first guide pivot axis spaced apart from the first link pivot axis, the first chain guide including
a first guide body including a first guide surface configured to be in contact with a chain, and
a first guide protrusion protruding from the first guide body and pivotally coupled to the first link about the first guide pivot axis, the first guide protrusion being spaced apart from the first link in an axial direction with respect to the first guide pivot axis to define an intermediate space between the first guide protrusion and the first link in the axial direction, the intermediate space being free of a spring,
the first link includes a first link body and a first link protrusion protruding from the first link body,
the first guide protrusion is pivotally coupled to the first link protrusion about the first guide pivot axis,
the first guide protrusion is spaced apart from the first link protrusion in the axial direction to define the intermediate space between the first guide protrusion and the first link protrusion in the axial direction,
the first link includes a first additional link protrusion protruding from the first link body, the first additional link protrusion being spaced apart from the first link protrusion in the axial direction, and
the first link protrusion and the first additional link protrusion are provided between the first guide protrusion and the first additional guide protrusion in the axial direction.

10. The derailleur according to claim 9, wherein
a first distance is defined between the first guide protrusion and the first link protrusion in the axial direction,
a first additional distance is defined between the first additional guide protrusion and the first additional link protrusion in the axial direction, and
the first distance is longer than the first additional distance.

11. The derailleur according to claim 1, wherein
the linkage structure includes a first link pin extending along the first guide pivot axis, and
the first link pin is configured to pivotally couple the first guide protrusion to the first link about the first guide pivot axis.

12. A derailleur for a human-powered vehicle, comprising:
a base member configured to be mounted to the human-powered vehicle;
a chain guide movable relative to the base member;
a linkage structure configured to movably couple the chain guide to the base member, and
an adjustment structure configured to change an end position of the chain guide, wherein
the linkage structure includes a first link pivotally coupled to the base member about a first link pivot axis,
the chain guide includes a first chain guide pivotally coupled to the first link about a first guide pivot axis spaced apart from the first link pivot axis, the first chain guide including
a first guide body including a first guide surface configured to be in contact with a chain, and
a first guide protrusion protruding from the first guide body and pivotally coupled to the first link about the first guide pivot axis, the first guide protrusion being spaced apart from the first link in an axial direction with respect to the first guide pivot axis to define an intermediate space between the first guide protrusion and the first link in the axial direction, the intermediate space being free of a spring,
the linkage structure includes a first link pin extending along the first guide pivot axis,
the first link pin is configured to pivotally couple the first guide protrusion to the first link about the first guide pivot axis,
the adjustment structure includes an adjustment screw and an adjustment support,
the adjustment support is pivotally coupled to the first link pin and includes a support hole, and
the adjustment screw extends through the support hole.

13. The derailleur according to claim 12, further comprising
a transmitting member configured to transmit actuation force to the linkage structure, wherein
the first link includes a threaded hole,
the adjustment screw includes
an external threaded part threadedly engaged with the threaded hole, and
a contact end configured to be in contact with the transmitting member to position the chain guide in the end position.

14. The derailleur according to claim 1, wherein
the linkage structure includes a second link pivotally coupled to the base member about a second link pivot axis, and
the chain guide includes a second chain guide pivotally coupled to the second link about a second guide pivot axis spaced apart from the second link pivot axis, the second chain guide being coupled to the first chain guide to move relative to the base member along with the first chain guide.

15. A derailleur for a human-powered vehicle, comprising:
a base member configured to be mounted to the human-powered vehicle;
a chain guide movable relative to the base member;
a linkage structure configured to movably couple the chain guide to the base member; and
a motor unit configured to apply actuation force to at least one of the chain guide and the linkage structure to move the chain guide relative to the base member,
the linkage structure including a first link pivotally coupled to the base member about a first link pivot axis,
the chain guide including a first chain guide pivotally coupled to the first link about a first guide pivot axis spaced apart from the first link pivot axis, the first chain guide including
a first guide body including a first guide surface configured to be in contact with a chain, and a first guide protrusion protruding from the first guide body and pivotally coupled to the first link about the first guide pivot axis, the first guide protrusion being spaced apart from the first link in an axial direction with respect to the first guide pivot axis to define an intermediate space between the first guide protrusion and the first link in the axial direction, the intermediate space being free of a spring.

16. A derailleur for a human-powered vehicle, comprising:
    a base member configured to be mounted to the human-powered vehicle;
    a chain guide movable relative to the base member between an inner-gear position and an outer-gear position, the chain guide being provided closer to a center plane of the human-powered vehicle when the chain guide is in the inner-gear position than when the chain guide is the outer-gear position;
    a linkage structure configured to movably couple the chain guide to the base member to move relative to the base member between the inner-gear position and the outer-gear position;
    a motor unit configured to apply actuation force to at least one of the chain guide and the linkage structure to move the chain guide relative to the base member; and
    a biasing member configured to bias the chain guide toward the inner-gear position,
    the linkage structure including a first link pivotally coupled to the base member about a first link pivot axis,
    the chain guide including a first chain guide pivotally coupled to the first link about a first guide pivot axis, the first chain guide including
        a first guide body including a first guide surface configured to be in contact with a chain,
        a first guide protrusion protruding from the first guide body and pivotally coupled to the first link about the first guide pivot axis, and
        a first additional guide protrusion protruding from the first guide body and pivotally coupled to the first link about the first guide pivot axis, the first additional guide protrusion being spaced apart from the first guide protrusion in an axial direction with respect to the first guide pivot axis, the first link being provided between the first guide protrusion and the first additional guide protrusion in the axial direction,
    the first link includes a first link protrusion, a first additional link protrusion, and a first link body connecting the first link protrusion and the first additional link protrusion,
    the first link body is offset from a plane extending through the first link pivot axis and the first guide pivot axis as viewed from the first link pivot axis,
    the first link protrusion includes a first link coupling part and a first guide coupling part,
    the first link coupling part is pivotally coupled to the base member about the first link pivot axis,
    the first guide coupling part is pivotally coupled to the first guide protrusion about the first guide pivot axis, and
    the first guide coupling part is offset from the first link coupling part in the axial direction.

17. The derailleur according to claim 16, wherein
    the first additional link protrusion is spaced apart from the first link protrusion in the axial direction,
    the first guide protrusion is pivotally coupled to the first link protrusion about the first guide pivot axis, and
    the first additional guide protrusion is pivotally coupled to the first additional link protrusion about the first guide pivot axis.

18. The derailleur according to claim 17, wherein
    the first link protrusion is pivotally coupled to the base member about the first link pivot axis, and
    the first additional link protrusion is pivotally coupled to the base member about the first link pivot axis.

19. The derailleur according to claim 16, wherein
    the first guide coupling part is closer to the first guide protrusion than the first link coupling part in the axial direction.

20. A derailleur for a human-powered vehicle, comprising:
    a base member configured to be mounted to the human-powered vehicle;
    a chain guide movable relative to the base member between an inner-gear position and an outer-gear position, the chain guide being provided closer to a center plane of the human-powered vehicle when the chain guide is in the inner-gear position than when the chain guide is the outer-gear position;
    a linkage structure configured to movably couple the chain guide to the base member to move relative to the base member between the inner-gear position and the outer-gear position;
    a motor unit configured to apply actuation force to at least one of the chain guide and the linkage structure to move the chain guide relative to the base member; and
    a biasing member configured to bias the chain guide toward the inner-gear position,
    the linkage structure including a first link pivotally coupled to the base member about a first link pivot axis,
    the chain guide including a first chain guide pivotally coupled to the first link about a first guide pivot axis, the first chain guide including
        a first guide body including a first guide surface configured to be in contact with a chain,
        a first guide protrusion protruding from the first guide body and pivotally coupled to the first link about the first guide pivot axis, and
        a first additional guide protrusion protruding from the first guide body and pivotally coupled to the first link about the first guide pivot axis, the first additional guide protrusion being spaced apart from the first guide protrusion in an axial direction with respect to the first guide pivot axis, the first link being provided between the first guide protrusion and the first additional guide protrusion in the axial direction,
    the linkage structure includes a second link pivotally coupled to the base member about a second link pivot axis,
    the first link includes a first link protrusion, a first additional link protrusion, and a first link body connecting the first link protrusion and the first additional link protrusion,
    the first link protrusion protrudes from the first link body toward an opposite side with respect to the second link,
    the first additional link protrusion protrudes from the first link body toward the opposite side with respect to the second link,
    the first link body includes a first link-outer edge and a first additional link-outer edge,
    the first link protrusion is provided at the first link-outer edge,
    the first additional link protrusion is provided at the first additional link-outer edge, and the first link-outer edge is offset with respect to the first additional link-outer edge toward the second link.

21. The derailleur according to claim 20, wherein the first additional link-outer edge is closer to the first link pivot axis than the first link-outer edge.

* * * * *